(12) United States Patent
Goyal et al.

(10) Patent No.: US 9,258,670 B2
(45) Date of Patent: Feb. 9, 2016

(54) WIRELESS ENABLED CAP FOR A DATA-CAPABLE DEVICE

(71) Applicants: Dileep Goyal, Fremont, CA (US); Shanky Subramanian, Santa Clara, CA (US); Hari N. Chakravarthula, San Jose, CA (US)

(72) Inventors: Dileep Goyal, Fremont, CA (US); Shanky Subramanian, Santa Clara, CA (US); Hari N. Chakravarthula, San Jose, CA (US)

(73) Assignee: AliphCom, San Francisco, CA (US)

( * ) Notice: Subject to any disclaimer, the term of this patent is extended or adjusted under 35 U.S.C. 154(b) by 0 days.

(21) Appl. No.: 14/181,595

(22) Filed: Feb. 14, 2014

(65) Prior Publication Data
US 2015/0237461 A1   Aug. 20, 2015

(51) Int. Cl.
| H04B 5/00 | (2006.01) |
| H01Q 1/24 | (2006.01) |
| H04W 4/00 | (2009.01) |
| H04B 1/3827 | (2015.01) |
| H04M 1/02 | (2006.01) |

(52) U.S. Cl.
CPC .............. *H04W 4/008* (2013.01); *H04B 1/385* (2013.01); *H04M 1/02* (2013.01)

(58) Field of Classification Search
USPC .............. 455/41.1, 41.2, 550.1, 575.1, 575.7, 455/90.1, 90.3, 347, 351; 343/702, 841, 343/842
See application file for complete search history.

(56) References Cited

U.S. PATENT DOCUMENTS

| 4,788,627 A | 11/1988 | Ehlert et al. |
| 4,819,860 A | 4/1989 | Hargrove et al. |
| 5,019,673 A | 5/1991 | Juskey et al. |
| 5,246,643 A | 9/1993 | Inaba et al. |
| 5,426,130 A | 6/1995 | Thurber et al. |
| 5,692,501 A | 12/1997 | Minturn |
| 5,924,979 A | 7/1999 | Swedlow et al. |
| 5,974,262 A | 10/1999 | Fuller et al. |
| 6,139,494 A | 10/2000 | Caimes |
| 6,156,461 A | 12/2000 | Grenon et al. |
| D439,981 S | 4/2001 | Kasabach et al. |

(Continued)

FOREIGN PATENT DOCUMENTS

| CA | 2413148 | 12/2001 |
| CA | 2413220 | 12/2001 |

(Continued)

OTHER PUBLICATIONS

U.S. Appl. No. 61/630,064, Ram David Adva Fish.

(Continued)

*Primary Examiner* — Thanh Le
(74) *Attorney, Agent, or Firm* — Kokka & Backus, PC

(57) ABSTRACT

A housing (e.g., a wearable structure) includes one or more sensors operative to capture sensor data and a plug operative to electrically communicate data (e.g., the sensor data) to another device via a hard wired connection. A wirelessly enabled cap may be removably coupled with the housing and may include: a cavity operative to house the plug; a RF chip disposed within the housing; and one or more antennas electrically coupled with the chip. The chip is operative to wirelessly communicate data (e.g., the sensor data) in accordance with one or more wireless communication protocols (e.g., short-range, long-range, near field). The one or more antennas may form an exterior portion(s) of the housing and/or may be embedded in a portion(s) of the housing. The chip may be passive powered from an external RF source (e.g., an externally generated RF signal electrically coupled with the chip through one or more antennas).

20 Claims, 12 Drawing Sheets

(56) References Cited

U.S. PATENT DOCUMENTS

| | | |
|---|---|---|
| 6,246,900 B1 | 6/2001 | Cosman et al. |
| 6,254,815 B1 | 7/2001 | Cheperak |
| D451,604 S | 12/2001 | Kasabach et al. |
| 6,356,940 B1 | 3/2002 | Short |
| D460,971 S | 7/2002 | Sica et al. |
| 6,486,801 B1 | 11/2002 | Jones |
| 6,527,711 B1 | 3/2003 | Stivoric et al. |
| 6,595,929 B2 | 7/2003 | Stivoric et al. |
| 6,605,038 B1 | 8/2003 | Teller et al. |
| 6,665,174 B1 | 12/2003 | Derr et al. |
| 6,714,859 B2 | 3/2004 | Jones |
| 6,904,359 B2 | 6/2005 | Jones |
| 6,952,645 B1 | 10/2005 | Jones |
| 6,984,886 B2 | 1/2006 | Ahn et al. |
| 7,020,508 B2 | 3/2006 | Stivoric et al. |
| 7,030,781 B2 | 4/2006 | Jones |
| 7,060,216 B2 | 6/2006 | Schuumans |
| 7,101,752 B2 | 9/2006 | Park et al. |
| 7,153,262 B2 | 12/2006 | Stivoric et al. |
| 7,196,972 B2 | 3/2007 | Pitocco et al. |
| 7,261,690 B2 | 8/2007 | Teller et al. |
| 7,276,802 B2 | 10/2007 | Hall et al. |
| 7,285,090 B2 | 10/2007 | Stivoric et al. |
| 7,306,567 B2 | 12/2007 | Loree, IV |
| 7,336,187 B2 | 2/2008 | Hubbard et al. |
| 7,343,260 B1 | 3/2008 | Kahn et al. |
| 7,364,445 B1 | 4/2008 | Ni et al. |
| 7,400,970 B2 | 7/2008 | Jones |
| 7,457,719 B1 | 11/2008 | Kahn et al. |
| 7,502,643 B2 | 3/2009 | Farringdon et al. |
| 7,647,195 B1 | 1/2010 | Kahn et al. |
| 7,647,196 B2 | 1/2010 | Kahn et al. |
| 7,653,508 B1 | 1/2010 | Kahn et al. |
| 7,655,508 B2 | 2/2010 | Johnson et al. |
| 7,662,065 B1 | 2/2010 | Kahn et al. |
| 7,689,437 B1 | 3/2010 | Teller et al. |
| 7,690,556 B1 | 4/2010 | Kahn et al. |
| 7,705,723 B2 | 4/2010 | Kahn et al. |
| 7,723,162 B2 | 5/2010 | Anderson et al. |
| 7,733,224 B2 | 6/2010 | Tran |
| 7,747,735 B1 | 6/2010 | Kahn et al. |
| 7,753,861 B1 | 7/2010 | Kahn et al. |
| 7,766,794 B2 | 8/2010 | Oliver et al. |
| 7,769,187 B1 | 8/2010 | Farrar et al. |
| 7,788,059 B1 | 8/2010 | Kahn et al. |
| 7,800,044 B1 | 9/2010 | Kahn et al. |
| 7,839,279 B2 | 11/2010 | Kahn et al. |
| 7,841,967 B1 | 11/2010 | Kahn et al. |
| 7,849,184 B1 | 12/2010 | Kahn et al. |
| D631,552 S | 1/2011 | Kasabach et al. |
| D632,396 S | 2/2011 | Kasabach et al. |
| 7,881,902 B1 | 2/2011 | Kahn et al. |
| 7,907,901 B1 | 3/2011 | Kahn et al. |
| 7,917,768 B2 | 3/2011 | Kahn et al. |
| 7,959,567 B2 | 6/2011 | Stivoric et al. |
| 7,970,586 B1 | 6/2011 | Kahn et al. |
| 7,982,770 B1 | 7/2011 | Kahn et al. |
| 7,987,070 B2 | 7/2011 | Kahn et al. |
| 7,993,276 B2 | 8/2011 | Nazarian et al. |
| D645,968 S | 9/2011 | Kasabach et al. |
| 8,040,382 B2 | 10/2011 | Kahn et al. |
| 8,047,966 B2 | 11/2011 | Dorogusker et al. |
| 8,049,614 B2 | 11/2011 | Kahn et al. |
| 8,064,759 B1 | 11/2011 | Kahn et al. |
| 8,073,707 B2 | 12/2011 | Teller et al. |
| 8,083,643 B2 | 12/2011 | Ng et al. |
| 8,096,960 B2 | 1/2012 | Loree, IV et al. |
| 2001/0004234 A1 | 6/2001 | Petelenz et al. |
| 2001/0037179 A1 | 11/2001 | Vock et al. |
| 2002/0019584 A1 | 2/2002 | Schulze et al. |
| 2002/0068873 A1 | 6/2002 | Nissila |
| 2002/0074877 A1 | 6/2002 | Lee et al. |
| 2002/0143491 A1 | 10/2002 | Scherzinger |
| 2002/0145571 A1* | 10/2002 | Hulick et al. ............... 343/702 |
| 2002/0183646 A1 | 12/2002 | Stivoric et al. |
| 2003/0046228 A1 | 3/2003 | Berney |
| 2003/0130595 A1 | 7/2003 | Mault |
| 2003/0137588 A1* | 7/2003 | Wang et al. .............. 348/207.99 |
| 2003/0236474 A1 | 12/2003 | Singh |
| 2004/0147818 A1 | 7/2004 | Levy et al. |
| 2004/0152957 A1 | 8/2004 | Stivoric et al. |
| 2004/0167409 A1 | 8/2004 | Lo et al. |
| 2005/0113650 A1 | 5/2005 | Pacione et al. |
| 2005/0140005 A1 | 6/2005 | Huang et al. |
| 2005/0245839 A1 | 11/2005 | Stivoric et al. |
| 2006/0065645 A1 | 3/2006 | Nakasu et al. |
| 2006/0074279 A1 | 4/2006 | Brover |
| 2006/0079740 A1 | 4/2006 | Silver et al. |
| 2006/0122474 A1 | 6/2006 | Teller et al. |
| 2006/0132477 A1 | 6/2006 | Kerr et al. |
| 2006/0224051 A1 | 10/2006 | Teller et al. |
| 2006/0237252 A1 | 10/2006 | Mobley et al. |
| 2007/0027370 A1 | 2/2007 | Brauker et al. |
| 2007/0072156 A1 | 3/2007 | Kaufman et al. |
| 2007/0105404 A1 | 5/2007 | Lee et al. |
| 2007/0173705 A1 | 7/2007 | Teller et al. |
| 2007/0185391 A1 | 8/2007 | Morgan |
| 2007/0186429 A1 | 8/2007 | Bonnet et al. |
| 2007/0197878 A1 | 8/2007 | Shklarski |
| 2007/0253602 A1 | 11/2007 | Amano |
| 2007/0254137 A1 | 11/2007 | Koppe et al. |
| 2007/0296571 A1 | 12/2007 | Kolen |
| 2008/0004904 A1 | 1/2008 | Tran |
| 2008/0032119 A1 | 2/2008 | Feldhahn et al. |
| 2008/0040615 A1 | 2/2008 | Carper et al. |
| 2008/0055074 A1 | 3/2008 | Gao et al. |
| 2008/0091089 A1 | 4/2008 | Guillory et al. |
| 2008/0154098 A1 | 6/2008 | Morris et al. |
| 2008/0167535 A1 | 7/2008 | Stivoric et al. |
| 2008/0176655 A1 | 7/2008 | James et al. |
| 2008/0183388 A1 | 7/2008 | Goodrich |
| 2008/0194928 A1 | 8/2008 | Bandic et al. |
| 2008/0208015 A1 | 8/2008 | Morris et al. |
| 2008/0216171 A1 | 9/2008 | Sano |
| 2008/0255979 A1 | 10/2008 | Slutzky et al. |
| 2008/0275309 A1 | 11/2008 | Stivoric et al. |
| 2009/0006458 A1 | 1/2009 | Stivoric et al. |
| 2009/0019374 A1 | 1/2009 | Logan et al. |
| 2009/0072955 A1 | 3/2009 | Cary |
| 2009/0076343 A1 | 3/2009 | James et al. |
| 2009/0077849 A1 | 3/2009 | Glass, Jr. et al. |
| 2009/0112626 A1 | 4/2009 | Talbot et al. |
| 2009/0118100 A1 | 5/2009 | Oliver et al. |
| 2009/0131759 A1 | 5/2009 | Sims et al. |
| 2009/0146947 A1 | 6/2009 | Ng |
| 2009/0150178 A1 | 6/2009 | Sutton et al. |
| 2009/0163774 A1 | 6/2009 | Thatha et al. |
| 2009/0192362 A1 | 7/2009 | Sweeney |
| 2009/0208756 A1 | 8/2009 | Kimura et al. |
| 2009/0218725 A1 | 9/2009 | Thelemann et al. |
| 2009/0264714 A1 | 10/2009 | Chou |
| 2009/0265183 A1 | 10/2009 | Pollard et al. |
| 2009/0292180 A1 | 11/2009 | Mirow |
| 2009/0311976 A1* | 12/2009 | Vanderaa et al. ............ 455/90.3 |
| 2009/0319221 A1 | 12/2009 | Kahn et al. |
| 2009/0319347 A1 | 12/2009 | Albrecht |
| 2010/0004947 A1 | 1/2010 | Nadeau et al. |
| 2010/0030578 A1 | 2/2010 | Siddique et al. |
| 2010/0041772 A1 | 2/2010 | Liversage et al. |
| 2010/0056878 A1 | 3/2010 | Partin et al. |
| 2010/0070867 A1 | 3/2010 | Lemmers |
| 2010/0119461 A1 | 5/2010 | Bicard-Benhamou et al. |
| 2010/0137106 A1 | 6/2010 | Oshima et al. |
| 2010/0156007 A1 | 6/2010 | Huang et al. |
| 2010/0217099 A1 | 8/2010 | LeBoeuf et al. |
| 2010/0221188 A1 | 9/2010 | Clark et al. |
| 2010/0240962 A1 | 9/2010 | Contant |
| 2010/0241465 A1 | 9/2010 | Amigo et al. |
| 2010/0268056 A1 | 10/2010 | Picard et al. |
| 2010/0279554 A1 | 11/2010 | Steijner |
| 2010/0284552 A1 | 11/2010 | Lasarov et al. |
| 2010/0305642 A1 | 12/2010 | Dong et al. |
| 2010/0315225 A1 | 12/2010 | Teague |
| 2010/0331146 A1 | 12/2010 | Kil |

(56) References Cited

U.S. PATENT DOCUMENTS

| | | | |
|---|---|---|---|
| 2010/0331682 A1 | 12/2010 | Stein et al. | |
| 2011/0004072 A1 | 1/2011 | Fletcher et al. | |
| 2011/0010188 A1 | 1/2011 | Yoshikawa et al. | |
| 2011/0046519 A1 | 2/2011 | Raheman | |
| 2011/0054359 A1 | 3/2011 | Sazonov et al. | |
| 2011/0066064 A1 | 3/2011 | Jangle et al. | |
| 2011/0071003 A1 | 3/2011 | Watterson et al. | |
| 2011/0087115 A1 | 4/2011 | Sackner et al. | |
| 2011/0095916 A1 | 4/2011 | Kass et al. | |
| 2011/0106627 A1 | 5/2011 | Le Boeuf et al. | |
| 2011/0125063 A1 | 5/2011 | Shalon et al. | |
| 2011/0160544 A1 | 6/2011 | Hayter | |
| 2011/0184247 A1 | 7/2011 | Contant et al. | |
| 2011/0230732 A1 | 9/2011 | Edman et al. | |
| 2011/0245633 A1 | 10/2011 | Goldberg et al. | |
| 2012/0313773 A1 | 12/2012 | Loree, IV | |
| 2013/0095941 A1* | 4/2013 | Bentley et al. | 343/841 |

FOREIGN PATENT DOCUMENTS

| | | |
|---|---|---|
| CA | 2441962 | 10/2002 |
| CA | 2454655 | 2/2003 |
| CA | 2496579 | 3/2004 |
| CA | 2560323 | 10/2005 |
| EP | 1414340 | 5/2004 |
| EP | 1534126 | 6/2005 |
| EP | 1639939 | 3/2006 |
| EP | 1702560 | 9/2006 |
| EP | 1734858 | 12/2006 |
| EP | 1743571 | 1/2007 |
| EP | 2126828 | 12/2009 |
| EP | 2358266 | 8/2011 |
| IL | 153516 | 7/2007 |
| IL | 160079 | 2/2009 |
| IL | 153478 | 3/2009 |
| IL | 158067 | 8/2009 |
| IL | 167045 | 4/2010 |
| IL | 178183 | 12/2013 |
| JP | 200251105 | 9/2002 |
| JP | 2004-500949 | 1/2004 |
| JP | 2005-536260 | 12/2005 |
| JP | 200750091 | 3/2007 |
| JP | 4125132 | 7/2008 |
| JP | 4283672 | 6/2009 |
| KR | 1020027017160 | 12/2002 |
| KR | 1020027017525 | 12/2002 |
| KR | 1020037012845 | 9/2003 |
| KR | 102004001744 | 2/2004 |
| KR | 1020057003029 | 2/2005 |
| MX | PA2005002024 | 6/2005 |
| WO | WO/01/96986 | 12/2001 |
| WO | WO/02/00111 | 1/2002 |
| WO | WO/02/078538 | 10/2002 |
| WO | WO/03/015005 | 2/2003 |
| WO | WO/2004/019172 | 3/2004 |
| WO | WO/2005/016124 | 2/2005 |
| WO | WO/2005/092177 | 10/2005 |
| WO | WO/2008/101248 | 8/2008 |
| WO | WO/2010/064162 | 6/2010 |
| WO | WO/2010/065067 | 6/2010 |
| WO | WO/2011/046657 | 4/2011 |

OTHER PUBLICATIONS

U.S. Appl. No. 61/627,891, Ram David Adva Fish.
U.S. Appl. No. 61/572,206, Rahman et al.
U.S. Appl. No. 61/572,204, Rahman et al.
U.S. Appl. No. 61/516,480, Fish et al.
U.S. Appl. No. 61/516,479, Fish et al.
U.S. Appl. No. 61/516,478, Fish et al.
U.S. Appl. No. 61/516,477, Ram David Adva Fish.
U.S. Appl. No. 61/511,541, Jeffery Miao.
U.S. Appl. No. 61/507,091, Rahman et al.
U.S. Appl. No. 61/495,997, Drysdale et al.
U.S. Appl. No. 61/495,996, Drysdale et al.
U.S. Appl. No. 61/495,995, Drysdale et al.
U.S. Appl. No. 61/495,994, Drysdale et al.
U.S. Appl. No. 61/404,381, Ram David Adva Fish.
U.S. Appl. No. 61/404,379, Fish et al.
U.S. Appl. No. 61/210,862, Ram David Adva Fish.
U.S. Appl. No. 61/210,821, Ram David Adva Fish.
U.S. Appl. No. 60/958,516, Andre et al.
U.S. Appl. No. 60/901,952, Stivoric et al.
U.S. Appl. No. 60/729,683, Stivoric et al.
U.S. Appl. No. 60,729,663, Donald G. Stein.
U.S. Appl. No. 60/727,357, Pacione et al.
U.S. Appl. No. 60/555,280, Pacione et al.
U.S. Appl. No. 60/510,013, Farringdon et al.
U.S. Appl. No. 60/502,764, Stivoric et al.
U.S. Appl. No. 60/502,746, Bucher et al.
U.S. Appl. No. 60/417,163, Andre et al.
U.S. Appl. No. 13/405,241, Rahman et al.
U.S. Appl. No. 13/361,919, Rahman et al.
U.S. Appl. No. 13/253,000, Ram David Adva Fish.
U.S. Appl. No. 13/247,975, Sashittal et al.
U.S. Appl. No. 13/181,513, Rahman et al.
U.S. Appl. No. 13/181,512, Rahman et al.
U.S. Appl. No. 13/181,511, Rahman et al.
U.S. Appl. No. 13/181,500, Rahman et al.
U.S. Appl. No. 13/181,498, Rahman et al.
U.S. Appl. No. 13/181,495, Rahman et al.
U.S. Appl. No. 13/181,486, Rahman et al.
U.S. Appl. No. 13/180,320, Rahman et al.
U.S. Appl. No. 13/180,000, Rahman et al.
U.S. Appl. No. 13/158,416, Drysdale et al.
U.S. Appl. No. 13/135,728, Drysdale et al.
U.S. Appl. No. 11/876,601, Stivoric et al.
U.S. Appl. No. 10/638,588, filed Feb. 19, 2004, Teller et al.
U.S. Appl. No. 10/682,293, filed Jul. 8, 2004, Teller et al.
U.S. Appl. No. 11/239,748, filed Nov. 23, 2006, Stivoric et al.
U.S. Appl. No. 11/481,147, filed Feb. 15, 2007, Stivoric et al.
U.S. Appl. No. 11/582,896, filed May 3, 2007, Stivoric et al.
U.S. Appl. No. 11/930,091, filed Jul. 3, 2008, Teller et al.
U.S. Appl. No. 11/930,081, filed Jul. 3, 2008, Teller et al.
U.S. Appl. No. 11/928,027, filed Jul. 3, 2008, Stivoric et al.
U.S. Appl. No. 11/930,101, filed Jul. 10, 2008, Teller et al.
U.S. Appl. No. 11/930,053, filed Jul. 10, 2008, Teller et al.
U.S. Appl. No. 11/930,048, filed Jul. 10, 2008, Teller et al.
U.S. Appl. No. 11/930,036, filed Jul. 10, 2008, Teller et al.
U.S. Appl. No. 11/928,051, filed Jul. 10, 2008, Stivoric et al.
U.S. Appl. No. 11/928,039, filed Jul. 10, 2008, Stivoric et al.
U.S. Appl. No. 11/930,100, filed Jul. 17, 2008, Teller et al.
U.S. Appl. No. 11/930,094, filed Jul. 17, 2008, Teller et al.
U.S. Appl. No. 11/930,092, filed Jul. 17, 2008, Teller et al.
U.S. Appl. No. 11/925,965, filed Jul. 17, 2008, Stivoric et al.
U.S. Appl. No. 11/925,908, filed Jul. 17, 2008, Teller et al.
U.S. Appl. No. 11/930,405, filed Jul. 24, 2008, Teller et al.
U.S. Appl. No. 11/928,302, filed Jul. 31, 2008, Farringdon et al.
U.S. Appl. No. 11/925,906, filed Jul. 31, 2008, Teller et al.
U.S. Appl. No. 11/925,903, filed Jul. 31, 2008, Teller et al.
U.S. Appl. No. 11/928,059, filed Sep. 4, 2008, Stivoric et al.
U.S. Appl. No. 11/927,365, filed Nov. 20, 2008, Stivoric et al.
U.S. Appl. No. 11/927,276, filed Nov. 20, 2008, Stivoric et al.
U.S. Appl. No. 12/033,766, filed Dec. 25, 2008, Stivoric et al.
U.S. Appl. No. 12/033,760, filed Dec. 25, 2008, Stivoric et al.
U.S. Appl. No. 12/033,753, filed Dec. 25, 2008, Stivoric et al.
U.S. Appl. No. 12/033,751, filed Dec. 25, 2008, Stivoric et al.
U.S. Appl. No. 12/033,746, filed Dec. 25, 2008, Stivoric et al.
U.S. Appl. No. 12/033,741, filed Dec. 25, 2008, Stivoric et al.
U.S. Appl. No. 12/033,737, filed Dec. 25, 2008, Stivoric et al.
U.S. Appl. No. 12/033,731, filed Dec. 25, 2008, Stivoric et al.
U.S. Appl. No. 12/033,722, filed Jan. 1, 2009, Stivoric et al.
U.S. Appl. No. 11/871,151, filed Apr. 16, 2009, Kahn et al.
U.S. Appl. No. 11/925,902, filed May 7, 2009, Teller et al.
U.S. Appl. No. 12/217,299, filed Jul. 9, 2009, Stivoric et al.
U.S. Appl. No. 12/113,110, filed Nov. 5, 2009, Kahn et al.
U.S. Appl. No. 12/469,633, filed Nov. 26, 2009, Kahn et al.

(56) References Cited

OTHER PUBLICATIONS

U.S. Appl. No. 12/490,304, filed Dec. 24, 2009, Kahn et al.
U.S. Appl. No. 12/202,206, filed Mar. 4, 2010, Kahn et al.
U.S. Appl. No. 12/247,950, filed Apr. 8, 2010, Kahn et al.
U.S. Appl. No. 12/560,069, filed Aug. 26, 2010, Nadkarni et al.
U.S. Appl. No. 12/730,199, filed Sep. 23, 2010, Ram David Adva Fish.
U.S. Appl. No. 12/730,194, filed Sep. 23, 2010, Ram David Adva Fish.
U.S. Appl. No. 12/621,099, filed Sep. 30, 2010, Nadkarni et al.
U.S. Appl. No. 12/840,109, filed Nov. 11, 2010, Farrington et al.
U.S. Appl. No. 12/472,361, filed Dec. 2, 2010, Kahn et al.
U.S. Appl. No. 12/823,280, filed Jan. 6, 2011, Bentley et al.
U.S. Appl. No. 12/883,304, filed Mar. 17, 2011, Jangle et al.
U.S. Appl. No. 12/684,881, filed Jul. 14, 2011, Kahn et al.
U.S. Appl. No. 13/204,658, filed Nov. 24, 2011, Jangle et al.
U.S. Appl. No. 13/182,352, filed Jan. 5, 2012, Nazarian et al.
U.S. Appl. No. 13/405,240, filed Feb. 25, 2012, Drysdale et al.
USPTO Office Action in U.S. Appl. No. 11/925,661, mailed Mar. 30, 2010.
USPTO Office Action in U.S. Appl. No. 13/427,839, mailed Jul. 12, 2012.
USPTO Office Action in U.S. Appl. No. 13/405,240, mailed Nov. 29, 2012.
USPTO Office Action in U.S. Appl. No. 13/181,495, mailed Mar. 28, 2012.
USPTO Office Action in U.S. Appl. No. 13/181,495, mailed Nov. 21, 2012.
USPTO Office Action in U.S. Appl. No. 13/361,919, mailed Mar. 23, 2012.
USPTO Office Action in U.S. Appl. No. 13/361,919, mailed Nov. 6, 2012.
USPTO Office Action in U.S. Appl. No. 13/405,241, mailed Sep. 21, 2012.
Lee W. Young; Notification of Transmittal of the International Search Report and the Written Opinion of the International Searching Authority, or the Declaration; International application No. PCT/US 12/31319; Date of Mailing Jul. 20, 2012.
Lee W. Young; Notification of Transmittal of the International Search Report and the Written Opinion of the International Searching Authority, or the Declaration; International application No. PCT/US 12/41964; Date of Mailing Aug. 28, 2012.
Lee W. Young; Notification of Transmittal of the International Search Report and the Written Opinion of the International Searching Authority, or the Declaration; International application No. PCT/US 12/31322; Date of Mailing Jul. 13, 2012.
Lee W. Young; Notification of Transmittal of the International Search Report and the Written Opinion of the International Searching Authority, or the Declaration; International application No. PCT/US 12/40797; Date of Mailing Aug. 10, 2012.
Lee W. Young; Notification of Transmittal of the International Search Report and the Written Opinion of the International Searching Authority, or the Declaration; International application No. PCT/US 12/38185; Date of Mailing Aug. 17, 2012.
Blaine R. Copenheaver; Notification of Transmittal of the International Search Report and the Written Opinion of the International Searching Authority, or the Declaration; International application No. PCT/US 12/039761; Date of Mailing Sep. 7, 2012.
Lee W. Young; Notification of Transmittal of the International Search Report and the Written Opinion of the International Searching Authority, or the Declaration; International application No. PCT/US 12/38201; Date of Mailing Jul. 20, 2012.
Shane Thomas; Notification of Transmittal of the International Search Report and the Written Opinion of the International Searching Authority, or the Declaration; International application No. PCT/US 12/41710; Date of Mailing Aug. 24, 2012.
Blaine R. Copenheaver; Notification of Transmittal of the International Search Report and the Written Opinion of the International Searching Authority, or the Declaration; International application No. PCT/US 12/41940; Date of Mailing Sep. 13, 2012.
Blaine R. Copenheaver; Notification of Transmittal of the International Search Report and the Written Opinion of the International Searching Authority, or the Declaration; International application No. PCT/US 12/38410; Date of Mailing Sep. 7, 2012.
Blaine R. Copenheaver; Notification of Transmittal of the International Search Report and the Written Opinion of the International Searching Authority, or the Declaration; International application No. PCT/US 12/41959; Date of Mailing Sep. 13, 2012.
Lee W. Young; Notification of Transmittal of the International Search Report and the Written Opinion of the International Searching Authority, or the Declaration; International application No. PCT/US 12/31325; Date of Mailing Jul. 24, 2012.
Lee W. Young; Notification of Transmittal of the International Search Report and the Written Opinion of the International Searching Authority, or the Declaration; International application No. PCT/US 12/41177; Date of Mailing Sep. 14, 2012.
Lee W. Young; Notification of Transmittal of the International Search Report and the Written Opinion of the International Searching Authority, or the Declaration; International application No. PCT/US 12/40965; Date of Mailing Aug. 1, 2012.
Lee W. Young; Notification of Transmittal of the International Search Report and the Written Opinion of the International Searching Authority, or the Declaration; International application No. PCT/US 12/39763; Date of Mailing Aug. 7, 2012.
Lee W. Young; Notification of Transmittal of the International Search Report and the Written Opinion of the International Searching Authority, or the Declaration; International application No. PCT/US 12/40047; Date of Mailing Aug. 16, 2012.
Lee W. Young; Notification of Transmittal of the International Search Report and the Written Opinion of the International Searching Authority, or the Declaration; International application No. PCT/US 12/40328; Date of Mailing Aug. 17, 2012.
Lee W. Young; Notification of Transmittal of the International Search Report and the Written Opinion of the International Searching Authority, or the Declaration; International application No. PCT/US 12/31326; Date of Mailing Aug. 3, 2012.
Lee W. Young; Notification of Transmittal of the International Search Report and the Written Opinion of the International Searching Authority, or the Declaration; International application No. PCT/US 12/40812; Date of Mailing Aug. 22, 2012.
Lee W. Young; Notification of Transmittal of the International Search Report and the Written Opinion of the International Searching Authority, or the Declaration; International application No. PCT/US 12/40590; Date of Mailing Sep. 7, 2012.
Lauren Goode; Sleep-Sensor Maker Lark Takes on Nike+ FuelBand With Larklife, All Things Digital, Oct. 8, 2012, The Wall Street Journal.
Deborah Porterfield; Life Gets Easier with New Tech Accessories, USA Today, Oct. 18, 2012.

* cited by examiner

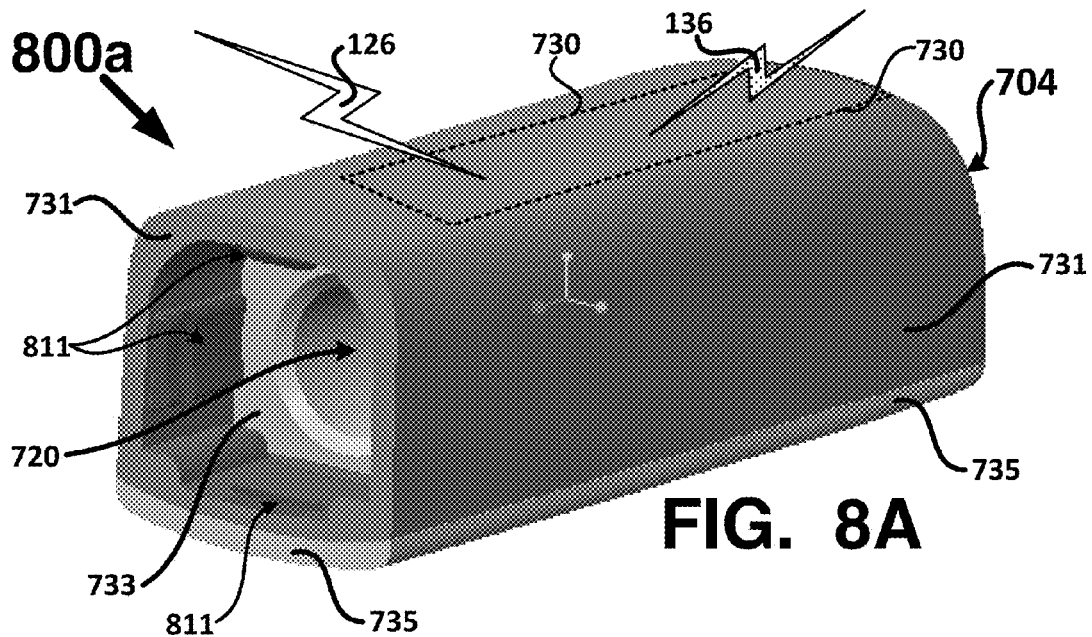
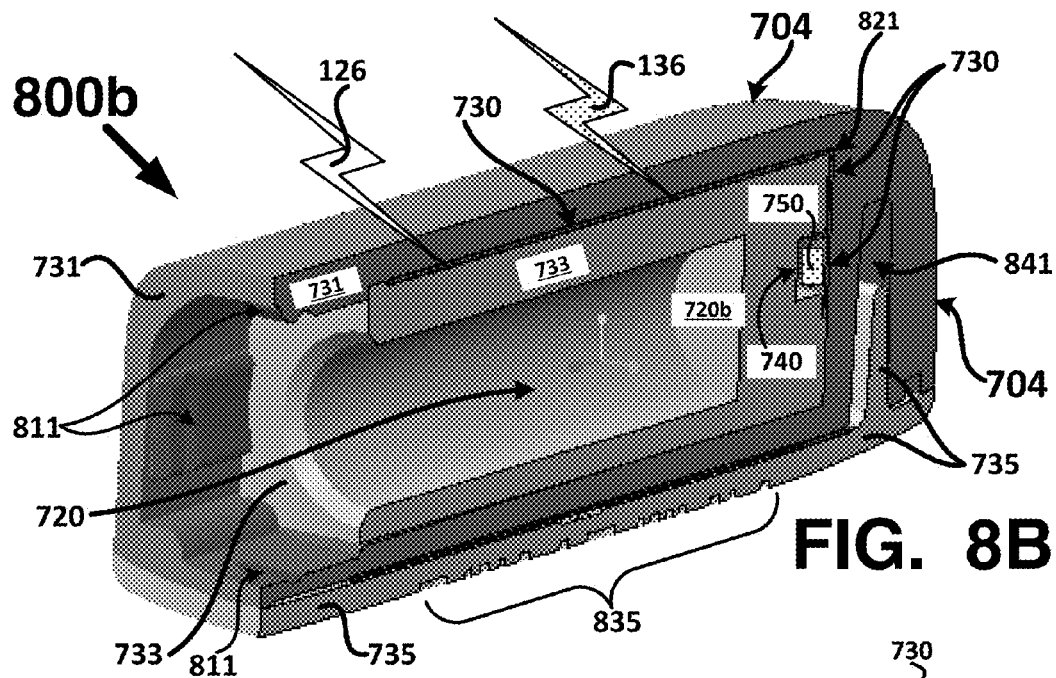
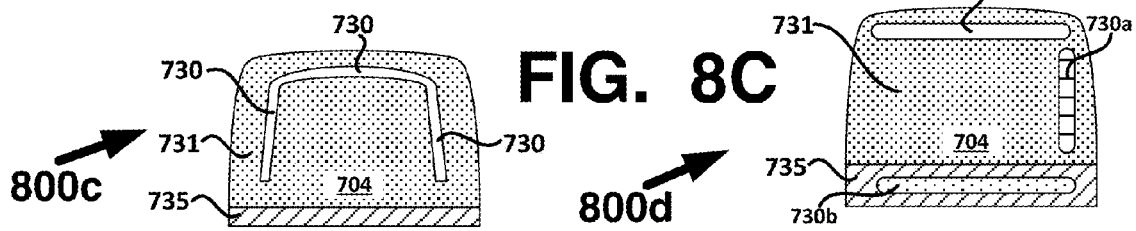

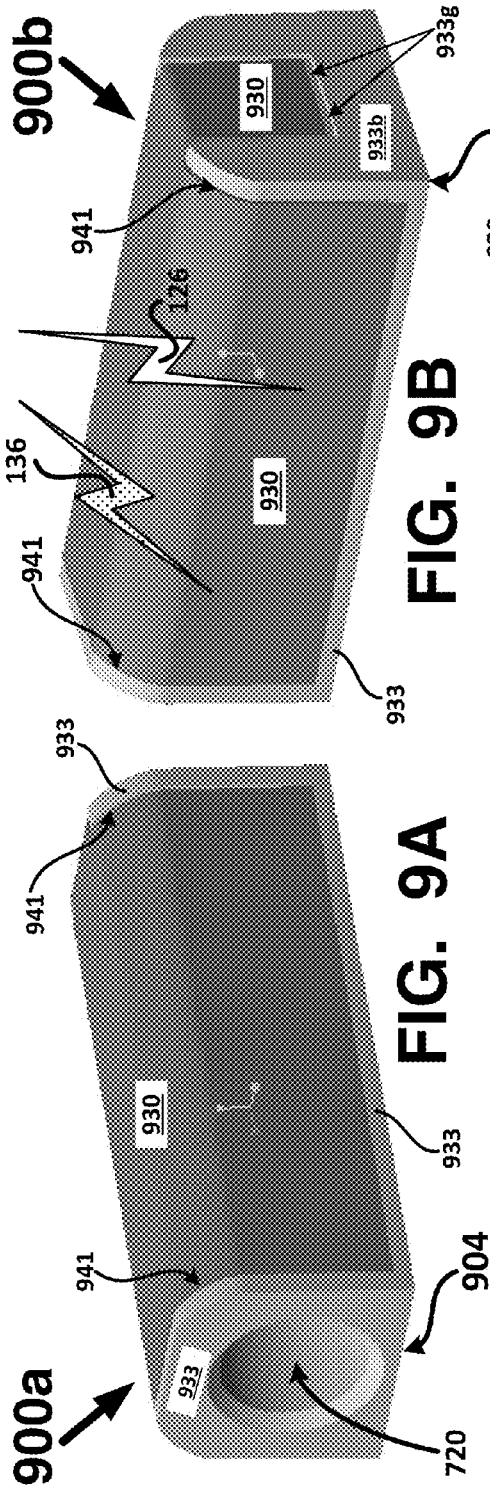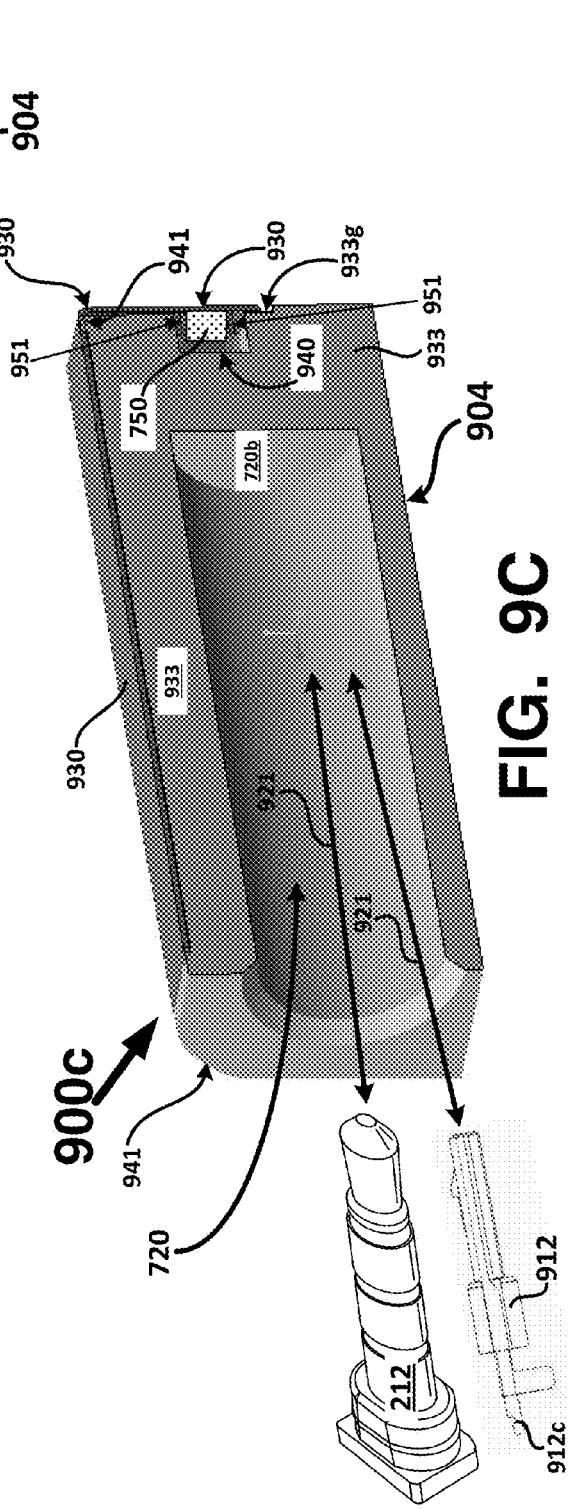

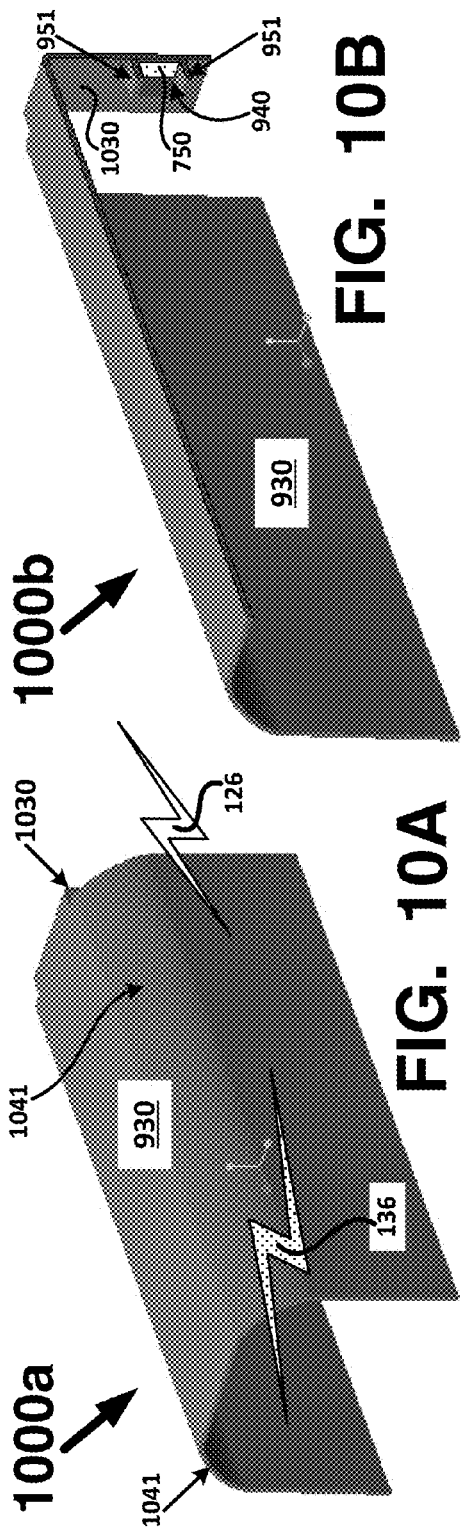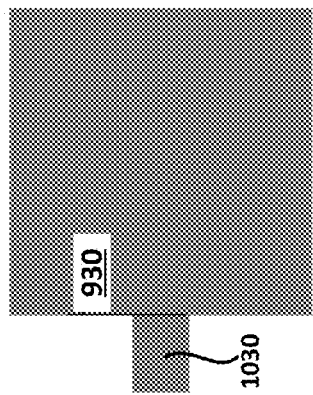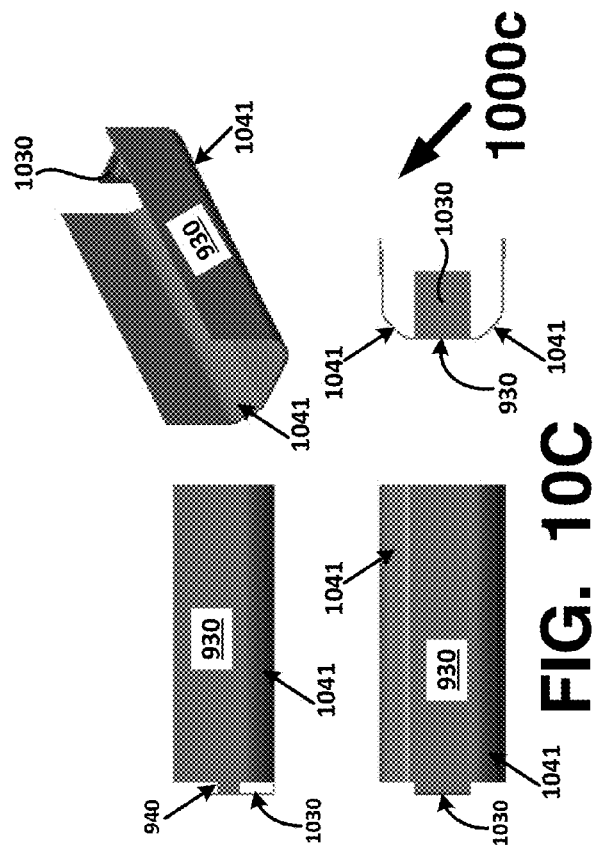
FIG. 10A FIG. 10B FIG. 10C FIG. 10D

WIRELESS ENABLED CAP FOR A DATA-CAPABLE DEVICE

CROSS-REFERENCE TO RELATED APPLICATIONS

This application is related to the following applications and issued U.S. patents: Co-Pending U.S. patent application Ser. No. 13/158,372, filed Jun. 10, 2011; Co-Pending U.S. patent application Ser. No. 13/180,320, filed Jul. 11, 2011; Co-Pending U.S. patent application Ser. No. 13/492,857, filed Jun. 9, 2012; Co-Pending U.S. patent application Ser. No. 13/181,495, filed Jul. 12, 2011; Co-Pending U.S. patent application Ser. No. 13/952,532, filed on Jul. 26, 2013, and titled "Radio Signal Pickup From An Electrically Conductive Substrate Utilizing Passive Slits"; Co-Pending U.S. patent application Ser. No. 14/144,517, filed on Dec. 30, 2013, and titled "Methods, Systems and Apparatus to Affect RF Transmission From a Non-Linked Wireless Client"; Co-Pending U.S. patent application Ser. No. 13/802,409, filed Mar. 13, 2013; and U.S. Pat. No. 8,446,275, issued on May 21, 2013, and titled "General Health And Wellness Management Method And Apparatus For A Wellness Application Using Data From A Data-Capable Band"; all of which are herein incorporated by reference in their entirety for all purposes.

FIELD

The present application relates generally to electrical and electronic hardware, computer software, wired and wireless network communications, and computing devices. More specifically, techniques for a wireless enabled cap for a data-capable device are described.

BACKGROUND

More and more functionalities are being introduced into wearable devices. Conventional wearable devices, such as a data-capable band, are being implemented as data capture devices, and are beginning to include a multitude of components to increase functionality. Such components include a multitude of sensors, PCBAs, other circuits, complex user interfaces, volatile and non-volatile memory, and multifaceted communications capabilities. It is becoming increasingly desirable to implement all of these functionalities into smaller and smaller profile devices, and to create structural elements of a wearable device that may support multiple functions.

Thus, what is needed is a solution for a wireless enabled cap for a data-capable device without the limitations of conventional techniques.

BRIEF DESCRIPTION OF THE DRAWINGS

Various embodiments of the present application are disclosed in the following detailed description and the accompanying drawings:

FIG. 8A depicts a profile view of a wireless enabled cap, according to some examples;

FIG. 8B depicts a cross-sectional profile view of a wireless enabled cap, according to some examples;

FIG. 8C depicts cross-sectional views of two examples of an antenna embedded in a material for a wireless enabled cap, according to some examples;

FIG. 9A depicts a front profile view of a wireless enabled cap including an antenna positioned on an exterior portion of the wireless enabled cap, according to some examples;

FIG. 9B depicts a back profile view of a wireless enabled cap including an antenna positioned on an exterior portion of the wireless enabled cap, according to some examples;

FIG. 9C depicts a cross-sectional profile view of a wireless enabled cap including an antenna positioned on an exterior portion of the wireless enabled cap, according to some examples;

FIG. 10A depicts a profile view of an antenna structure for a wireless enabled cap, according to some examples;

FIG. 10B depicts a cross-sectional profile view of an antenna structure for a wireless enabled cap, according to some examples;

FIG. 10C depicts a plurality of views of an antenna structure for a wireless enabled cap, according to some examples;

FIG. 10D depicts a plan view of an electrically conductive substrate that may be used as a starting material for an antenna structure for a wireless enabled cap, according to some examples;

Figure 1:
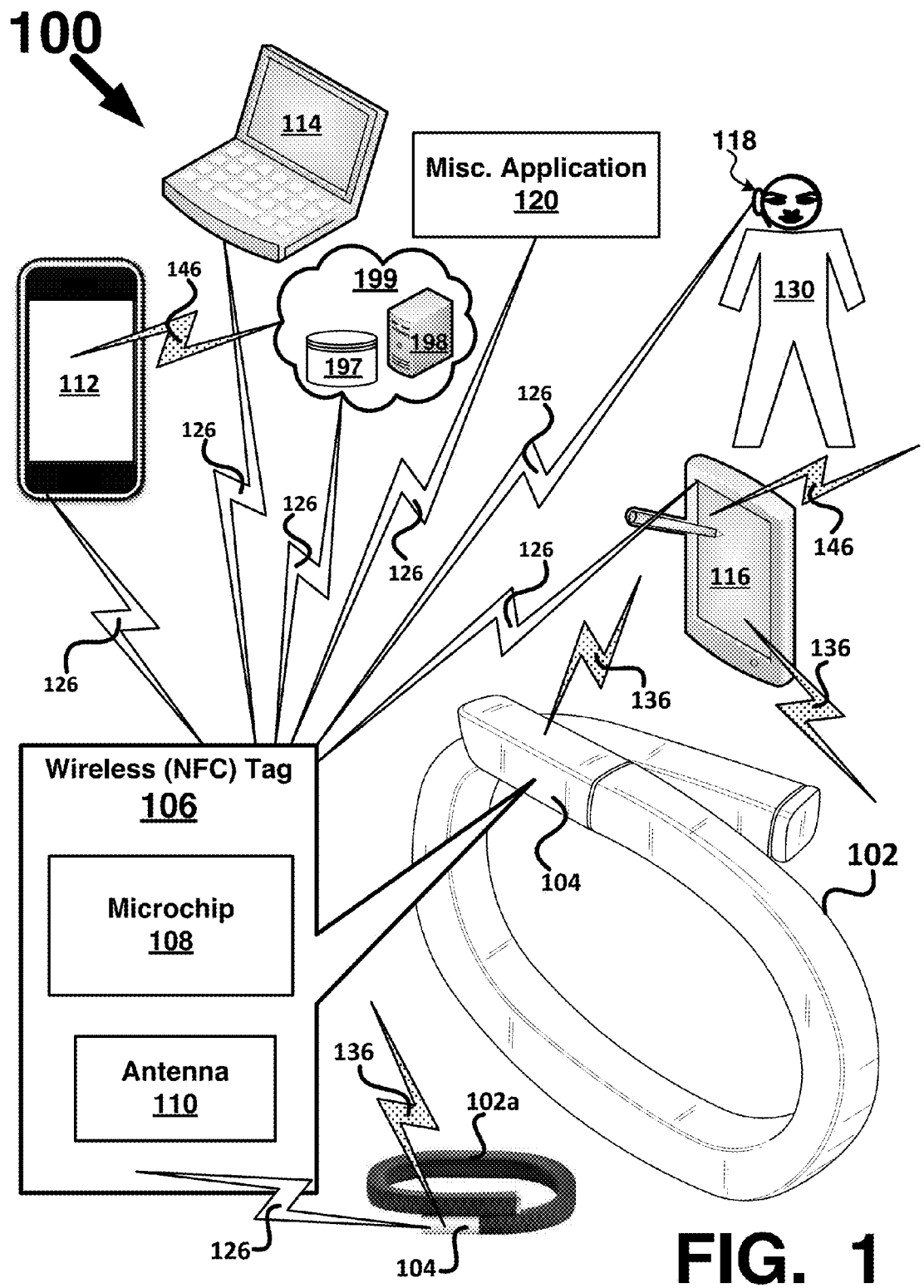
FIG. 1 illustrates an exemplary system of wireless devices including a data-capable band implemented with a wireless enabled cap, according to some examples.

Although the above-described drawings depict various examples of the present application, the present application is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, an apparatus, a user interface, or a series of program instructions on a non-transitory computer readable medium such as a non-transitory computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application" or "APP") or as a plug-in, module, or sub-component of another application. The described techniques may be implemented as software, hardware, firmware, circuitry, or a combination thereof. If implemented as software, then the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Software and/or firmware implementations may be embodied in a non-transitory computer readable medium configured for execution by a general purpose computing system or the like. The described techniques may be varied and are not limited to the examples or descriptions provided.

FIG. 1 illustrates an exemplary system of wireless devices including a data-capable band implemented with a wireless enabled cap, according to some examples. Here, system 100 includes data-capable band (hereinafter "band") 102, cap 104, wireless tag 106, microchip 108, antenna 110, mobile device 112, laptop 114, tablet 116, headset 118 (e.g., worn on a head or an ear of a user 130) and miscellaneous application 120. In some examples, band 102 may be implemented as a data-capable strapband as depicted and/or described in the above mentioned Co-Pending U.S. patent applications, which are incorporated herein by reference in their entirety for all purposes. Microchip 108 may comprise a RF chip, RF circuitry, a chip, a tag, RF tag, a NFC chip, a NFC tag chip, an ASIC, or other device. For example, microchip 108 may comprise a semiconductor die including analog and/or digital circuitry for RF communications according to one or more wireless protocols and/or standards.

Figure 4:
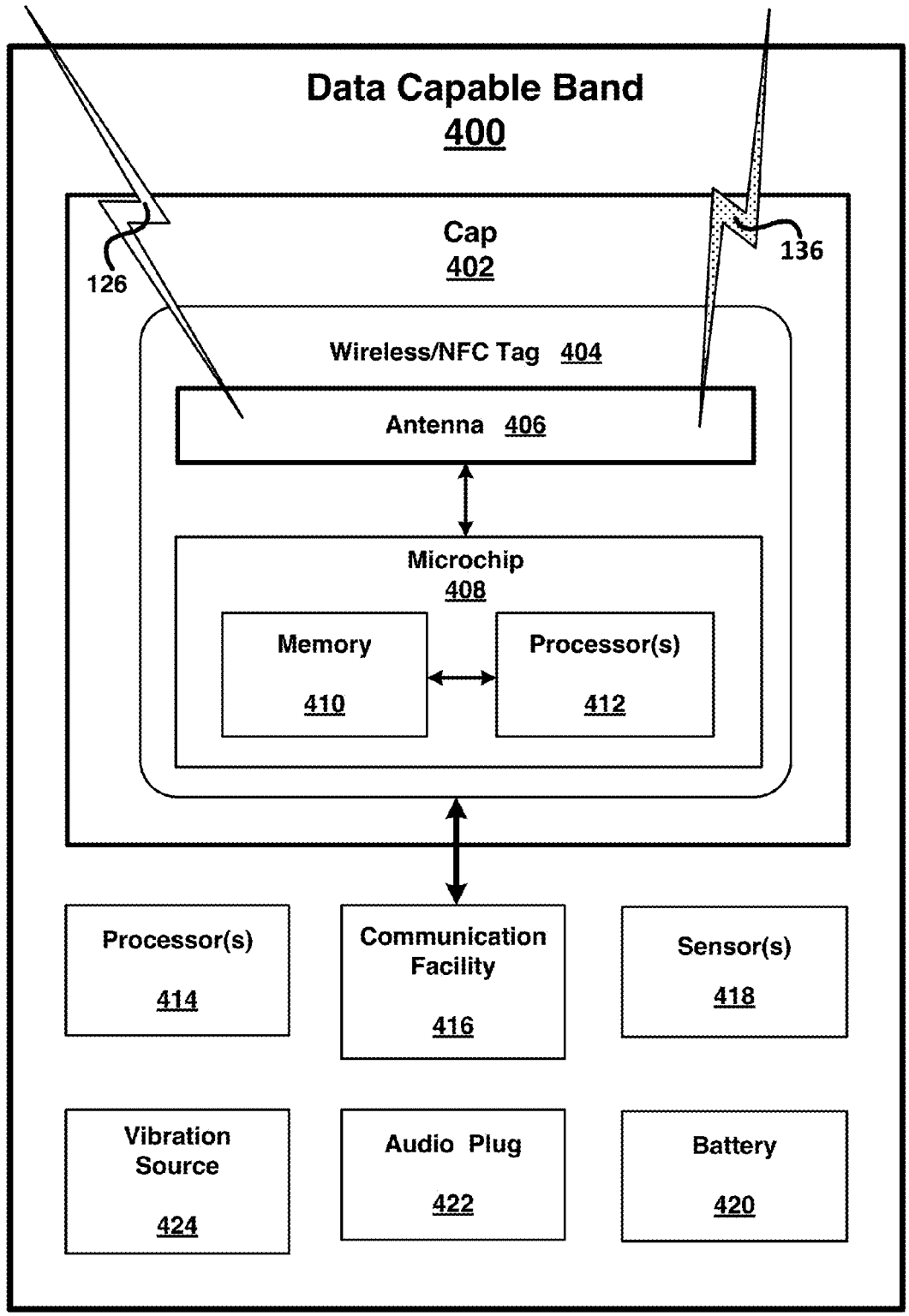
FIG. 4 illustrates an exemplary architecture for a data-capable band implemented with a wireless enabled cap, according to some examples.

For example, band 102 may be implemented as a wearable data capture device, including one or more sensors (e.g., sensor(s) 418 in FIG. 4 and the like), or a sensor array, (e.g., active and/or passive sensors) for capturing sensor data relating to temperature, environment, time, motion, activity, accelerometry, physiology, medical condition, biometric conditions, and the like. In some examples, band 102 may be configured to collect local sensor data using said sensor array, which may include, without limitation, an accelerometer, an altimeter/barometer, a light/infrared ("IR") sensor, a pulse/heart rate ("HR") monitor, an audio sensor (e.g., microphone, transducer, or others), a pedometer, a velocimeter, a global positioning system (GPS) receiver, a location-based service sensor (e.g., sensor for determining location within a cellular or micro-cellular network, which may or may not use GPS or other satellite constellations for fixing a position), a motion detection sensor (e.g., a single or multi-axis accelerometer and/or a gyroscope), an environmental sensor, one or more biometric sensors (e.g., heart rate, respiration, body temperature, GSR, EMG, bioimpedance, arousal of the sympathetic nervous system—SNS, etc.), a chemical sensor, an electrical sensor, or mechanical sensor, and the like, installed, integrated, or otherwise implemented on band 102.

In other examples, band 102 also may be configured to capture data from distributed sources (e.g., by communicating with mobile computing devices, other bands 102, mobile communications devices, wireless client devices (e.g., a smartphone or tablet), computers, laptops, tablets, pads, distributed sensors, GPS satellites, or the like) for processing with sensor data. Band 102 may wirelessly transmit sensor data (e.g., motion signals, biometric signals) to external wireless devices and/or wireless systems (e.g., other bands 102, wireless client devices, etc.), and may wirelessly receive data including sensor data from external wireless devices and/or wireless systems (e.g., from other bands 102, wireless client devices, etc.). Processing and/or storage of data (e.g., sensor data) may occur internal to band 102, external to band 102 or both. For example, resource 199 may be an external system that may include or have access to a data storage system 197 (e.g., a hard drive, SSD, RAID, NAS) and a compute engine 198 (e.g., a PC, a server, laptop, tablet, etc.). As another example, device 112 or device 114 may be an external system that may include data storage and computing resources that may be accessed by band 102.

In some examples, one or both of band 102 and cap 104 may be configured to communicate wirelessly 126 with other wireless devices, wireless systems, or applications, including, without limitation, mobile device 112 (e.g., a wireless client device such as a smartphone), laptop 114, tablet or pad 116, headset 118, miscellaneous application 120, one or more other bands 102a, resource 199 (e.g., the Cloud or the Internet), and the like. In some examples, cap 104 and/or band (102, 102a) may wirelessly communicate with other wireless devices or systems using another wireless device (e.g., 112 or 116) as an intermediary transceiver (e.g., a RF relay station), such as wireless communication between band/cap (102, 104) and resource 199 via device 112 using wireless links 126 and 146, or wireless communication between band/cap (102, 104) and band/cap 102a/104 via device 116 using wireless links 126 and 136. In some examples, wireless tag 106 may be implemented as a wireless controller configured to exchange data with said other wireless devices, for example, using short-range communication protocols (e.g., Bluetooth® (BT), Bluetooth® Low Energy (BTLE), ultra wideband, near field communication (NFC), or the like) or longer-range communication protocols (e.g., satellite, mobile broadband (e.g., 5G, 4G, 3G, 2G or the like), other cellular networks, GPS, one or more varieties of IEEE 802.x such as 802.11a/b/g/n (WiFi), WiMAX, other wireless local area network (WLAN), and the like). In some examples, cap 104 may be enabled with near-field communications (NFC) capabilities (e.g., from a NFC chip), and thus may be able to establish a two-way radio communication with another NFC-enabled device through touching the two devices together, or bringing them into close enough proximity to establish an NFC connection (e.g., a few centimeters or other close distance sufficient for establishing an NFC link).

For example, cap 104 may include a wireless or NFC tag, card or chip (hereinafter "tag") 106, which may be configured to provide stored data, including data stored using microchip 108, using a radio frequency (RF) field. In some examples, wireless tag 106 may include microchip 108 and antenna 110, which may be electrically coupled to (e.g., able to transfer electrical energy or an electrical signal to and from) each other. In some examples, microchip 108 also may be electrically coupled to one or more other components of band 102. In some examples, wireless tag 106 may be implemented as an unpowered NFC tag, which may be powered or activated by coming within a threshold proximity (e.g., a few centimeters or other close distance sufficient for establishing an NFC link) of a powered NFC device (e.g., band 102, mobile device 112, laptop 114, tablet 116, headset 118, miscellaneous application 120, or the like). Once within a threshold proximity of a powered NFC device, wireless tag 106 may take one or more actions including but not limited to provide data, such as a biometric identifier, other identifier, verification information, authentication information, control data to cause an application (e.g., run or operated using mobile device 112, laptop 114, tablet 116, headset 118, miscellaneous application 120, or the like) to open, to pair Bluetooth® devices, to sync Bluetooth® devices, to turn on Bluetooth® or WiFi capabilities in band 102, to accept programming, to accept re-programming, to accept configuration, to accept re-configuration, to accept software updates, to accept operating system (OS) updates, to sync band 102 with an application (e.g., run or operated using mobile device 112, laptop 114, tablet 116, headset 118, miscellaneous application 120, or the like), to modify settings on another device, or the like), or other discreet stored data, to one or more of band 102, mobile device 112, laptop 114, tablet 116, headset 118, resource 199, miscellaneous application 120. In other examples, wireless tag 106 may include other wireless controller circuits. In still other examples, the quantity, type, function, structure, and configuration of the elements shown may be varied and are not limited to the examples provided. In still other examples, the quantity, type, function, structure, and configuration of the elements shown may be varied and are not limited to the examples provided.

In some examples, microchip 108 may be a passive electrical device that may not receive electrical power directly from band 102 or any circuitry or power source(s) in band 102. As one example, microchip 108 may include circuitry to passively receive electrical power from an external source other than circuitry or power sources in the band 102. The external source may be an externally generated RF signal that is electrically coupled with the microchip 108 through an antenna, such as antenna 110, for example. A device having a radio or the like that may generate an RF signal, such as devices 112, 114, 116, or 118 depicted in FIG. 1, a device configured for NFC, a device configured for very short range (e.g., in near field proximity of a wireless client device(s)) RF communication, or other RF/wirelessly enabled device, may be the source of the externally generated RF signal, for example. Microchip 108 may be disposed within the housing and configured to electrically communicate stored data in accordance with one or more short-range wireless communication standards and/or protocols. Energy from the externally generated RF signal may be received by the antenna (e.g., 110) and electrically coupled with microchip 108 as a signal. Circuitry in the microchip 108 may convert the received signal into electrical power to power the microchip 108. A close or very close proximity (e.g., in a near field proximity) between a device that generates the externally generated RF signal and the antenna may be necessary for a received signal strength (e.g., RSSI) at the antenna to be of sufficient power to generate electricity within microchip 108 when the externally generated RF signal is coupled with the antenna. For example, as described above, the microchip (e.g., its antenna 110 or the like) coming within a threshold proximity (e.g., a few centimeters or other close distance sufficient for establishing an NFC link) of a powered NFC device or other device that may generate a RF signal external to the band 102, may cause microchip 108 to be powered up and take one or more actions as described herein. The antenna 110 may comprise a flexible printed circuit (FPC) antenna or may be implemented using a conductive ink as described herein (e.g., see 1230 in FIG. 12). The FPC antenna may include one or more electrically conductive structures and/or patterns formed on a FPC dielectric material or a flux field directional material (FFDM), for example.

In some examples, band 102 may be implemented with cap 104, which may be removably coupled to band 102. As used herein, "coupled" may be used to refer to electrical coupling, physical coupling, or both. For example, cap 104 may be configured to snap onto and off of an end of band 102. In another example, cap 104 may be tethered or leashed (not shown) to band 102 such that it may be uncapped, and still remain coupled to band 102. In some examples, cap 104 may be configured to cover a plug (e.g., plug 212 in FIG. 2, or the like) at an end of band 102. In some examples, cap 104 may include one or more housings and a plate forming a top surface of cap 104, said plate or top surface of cap 104 configured to receive material, for example, as a printed material deposited in the form of a logo, name or other image or text (see, e.g., plate 204 in FIG. 2). In other examples, said plate or top surface of cap 104 may be integrally molded as part of an outer housing of cap 104. In some examples, wireless tag 106 may include microchip 108 and antenna 110. In some examples, microchip 108 may be configured to store at least 128 bytes, and up to 2,000 bytes or more, of data, and may be configured to operate at a frequency of 13.56 MHz or 13.6 MHz according to an NFC standard. In some examples, microchip 108 may be NFC Forum Type 2 tag compliant, NFC Forum Type 4 tag compliant, or the like. Other examples include NFC standards maintained by the NFC Forum of Wakefield, Mass. In still other examples, the quantity, type, function, structure, and configuration of the elements shown may be varied and are not limited to the examples provided.

Figure 2:
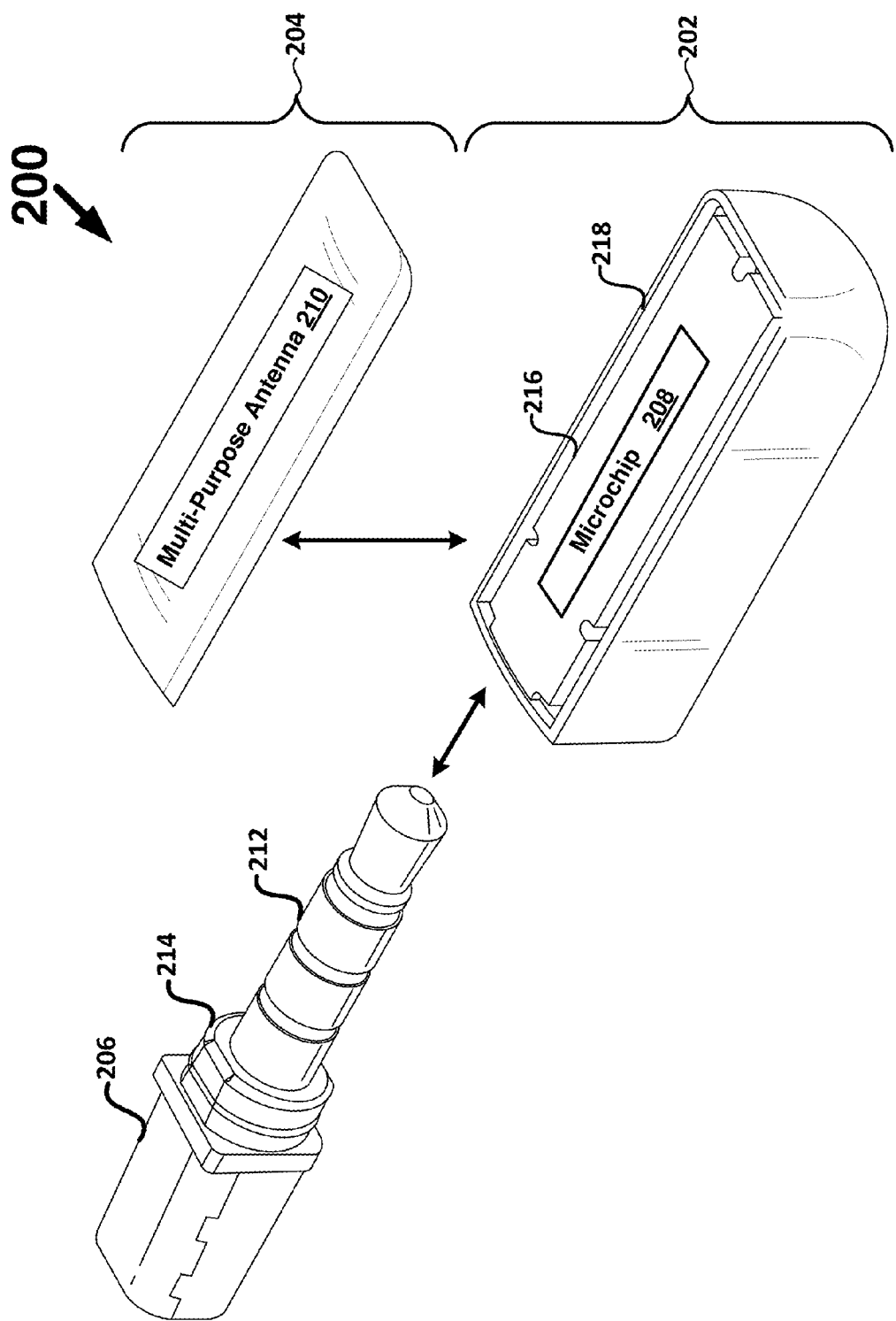
FIG. 2 illustrates a diagram depicting an exemplary wireless enabled cap for a data-capable band, according to some examples.

FIG. 2 illustrates a diagram depicting an exemplary wireless enabled cap for a data-capable band, according to some examples. Here, diagram 200 includes cap 202, plate 204, band 206, microchip 208, multi-purpose antenna 210, plug 212 and plug base 214. Like-numbered and named elements may describe the same or substantially similar elements as those shown in other descriptions. In some examples, cap 202 may include an inner housing 216 and an outer housing 218. In some examples, inner housing 216 and outer housing 218 may be integrally molded, for example, to form a single housing. In other examples, they may be molded separately. In some examples inner housing 216 may fit within outer housing 218. In some examples, inner housing 216 may have a cavity (not shown) configured to receive plug 212, and in some examples, plug base 214 as well. In some examples, an end of housings 216 and 218 may have an opening (not shown) leading into said cavity, said opening configured to receive plug 212. In some examples, plug 212 may be coupled to an end of band 206, for example at plug base 214, and be configured to send, receive or otherwise transfer data (e.g., sensor data, identification data, verification data, and the like) to one or more other devices (e.g., mobile device 112, laptop 114, tablet 116, headset 118, miscellaneous application 120 in FIG. 1, and the like) equipped with a socket configured to receive plug 212 and to receive plug 212 for data exchange. In some examples, plug 212 may be implemented as a connector including but not limited to a TRRS-type, TRS-type or TS-type analog audio plug (e.g., 3.5 mm, 2.5 mm or the like), a Universal Serial Bus (USB) type (e.g., micro USB, mini USB, etc.), or other types of analog or digital plugs (e.g., for audio and/or video), which may be used in connection with firmware and software that allow for the transmission of audio tones to send or receive encoded data, which may be performed using a variety of encoded waveforms and protocols, without limitation.

In some examples, cap 202 and plate 204 may be molded using any type of suitable material, including plastics, thermoplastics, thermoplastic elastomers (TPEs), polymers, elastomers, or any other organic or inorganic material. The material may be molded to form 202 and/or 204, for example. In some examples, cap 202 and plate 204 may be integrally molded as a monolithic cap. In some examples, microchip 208 may be mounted on (e.g., using insert molding, other molding techniques, or the like), embedded within, or otherwise disposed on, (hereinafter collectively "disposed on") any side or surface (e.g., interior or exterior side) of, or within any wall of, inner housing 216 or outer housing 218. In some examples, multi-purpose antenna 210 may be disposed on plate 204, which may be configured to cover, or form a top side and surface of, or otherwise couple with, cap 202. In some examples, multi-purpose antenna 210 may be formed using conductive ink embedded, or disposed, onto plate 204, for example, in the shape of a logo or text (e.g., see 1230 in FIG. 12). In this way, multi-purpose antenna 210 may serve decorative, informative, and data exchange purposes. For example, conductive ink may be used to print a company name, a slogan, a product name, a Trademark, a Service Mark, an image, icon, artwork, ASCII characters, text, other stylized logo, or the like, in one or more colors, with the conductive ink also serving as an antenna. Plate 204 or some other substrate may be made from and electrically non-conductive material including but not limited to plastic, rubber, silicon, glass, a synthetic material, a composite material, Teflon, PVDF, or the like, just to name a few. The conductive ink (e.g., for multi-purpose antenna 210) may be printed, screen printed, sprayed, or otherwise formed or deposited on the plate 204 or substrate. In some examples, multi-purpose antenna 210 may be electrically coupled to (e.g., able to transfer electrical energy or an electrical signal to and from) microchip 208, directly or indirectly. In other examples, an antenna may be implemented elsewhere on cap 202, apart from a logo, either on plate 204 or on a side or surface of cap 202 (see, e.g., antennas 308-312c in FIG. 3, and the like). In still other examples, the quantity, type, function, structure, and configuration of the elements shown may be varied and are not limited to the examples provided.

Figure 3:
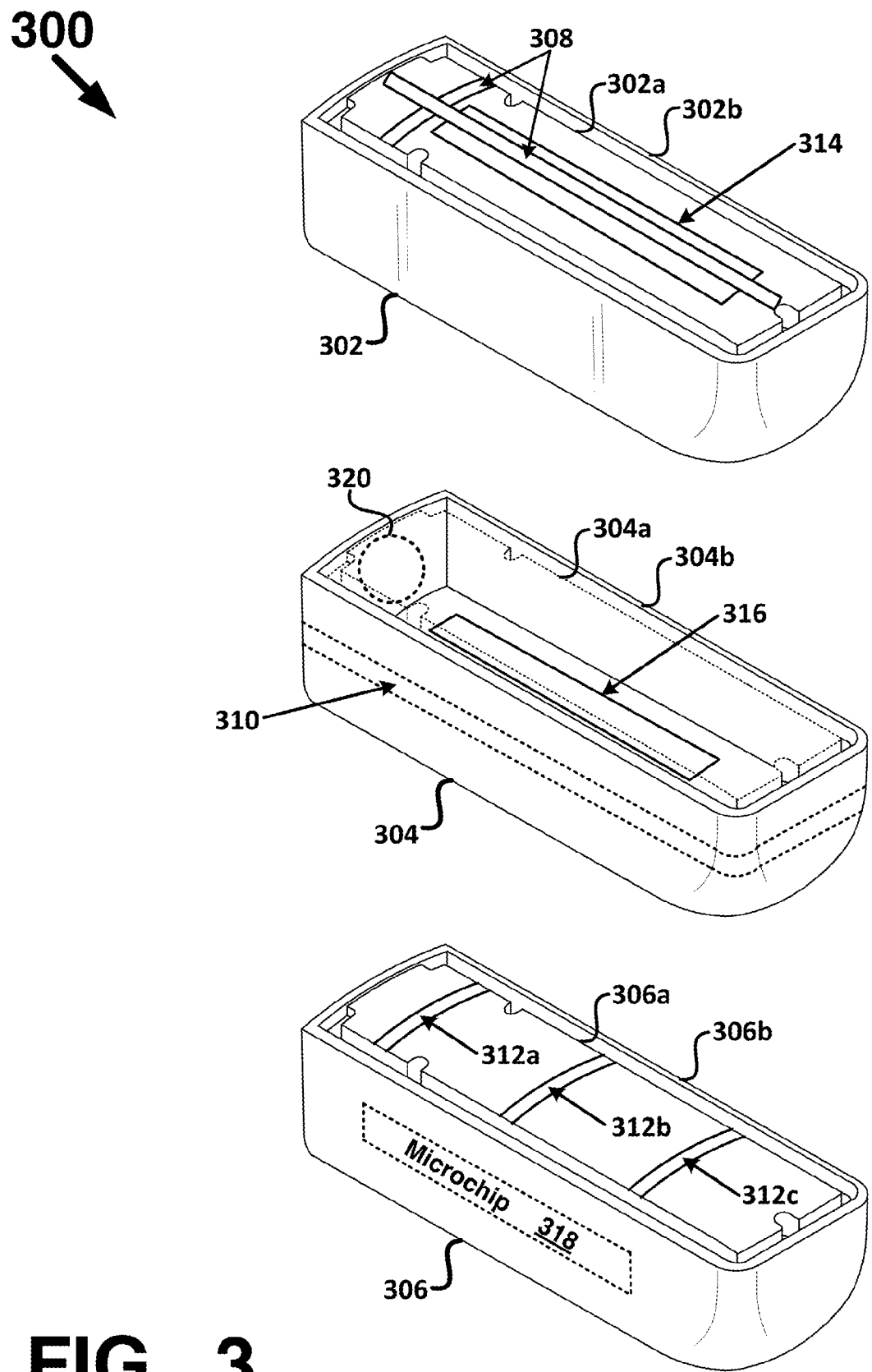
FIG. 3 is a diagram depicting exemplary placements of components in a wireless enabled cap for a data-capable band, according to some examples.

FIG. 3 is a diagram depicting exemplary placements of components in a wireless enabled cap for a data-capable band, according to some examples. Here, diagram 300 includes caps 302-306, antennas 308-312c, microchips 314-318 and opening 320 (depicted in dashed line). Like-numbered and named elements may describe the same or substantially similar elements as those shown in other descriptions. In some examples, cap 302 may include inner housing 302a and outer housing 302b, cap 304 may include inner housing 304a and outer housing 304b, and cap 306 may include inner housing 306a and outer housing 306b. In some examples, caps 302-306 each may include a plate (e.g., plate 204 in FIG. 2, or the like) configured to fit onto outer housings 302b-306b, and to cover inner housings 302a-306a. In some examples, cap 302 may include antenna 308 and microchip 314 disposed on any surface of inner housing 302a. In other examples, antenna 308 and microchip 314 may be disposed on other surfaces (e.g., inner or outer, side or bottom, or the like) of inner housing 302a. In still other examples, antenna 308 and microchip 314 may be embedded into a top side, or other side of inner housing 302a. In other examples, antenna 308 may be inserted or otherwise positioned in an opening of inner housing 302a during a manufacturing step, such as a molding process, for example. In some examples, antenna 308 and microchip 314 may be electrically coupled. In other examples, the quantity, type, function, structure, and configuration of the elements shown may be varied and are not limited to the examples provided.

In some examples, cap 304 may include opening 320, which may be configured to open into a cavity configured to receive a plug (e.g., plug 212 in FIG. 2, and the like). In some examples, cap 304 may include antenna 310 embedded into or disposed on (hereinafter "disposed on") one or more sides (e.g., inner or outer, side, top or bottom, or the like) of outer housing 304b. In some examples, cap 304 also may include microchip 316 disposed on one or more sides (e.g., inner or outer, side, top or bottom, or the like) of inner housing 304a. In still other examples, microchip 316 may be disposed on outer housing 304b, and antenna 310 may be disposed on inner housing 304a. In some examples, antenna 310 and microchip 316 may be electrically coupled. In other examples, the quantity, type, function, structure, and configuration of the elements shown may be varied and are not limited to the examples provided.

In some examples, cap 306 may include antennas 312a-312c, disposed on a top surface of inner housing 306a. In other examples, antennas 312a-312c may be disposed on a different surface (e.g., inner or outer, side or bottom, or the like) of inner housing 306a. In still other examples, antennas 312a-312c may be disposed on a side of outer housing 306b. In some examples, cap 306 also may include microchip 318, disposed on a side (e.g., inner or outer, side, top or bottom, or the like) of outer housing 306b. In other examples, microchip 318 may be disposed on a side of inner housing 306a. In some examples, antennas 312a-312c may be electrically coupled to microchip 318. In other examples, the quantity, type, function, structure, and configuration of the elements shown may be varied and are not limited to the examples provided.

In some examples, microchips 314-318 each also may be electrically coupled, wired or wirelessly, with one or more components of a band (e.g., band 102 in FIG. 1, band 206 in FIG. 2, band 400 in FIG. 4, or the like). For example, electrical contacts may be disposed in caps 302-306 to couple microchips 314-318 to a plug that is coupled to a band. In another example, electrical contacts may be disposed in caps 302-306 to couple microchips 314-318 to a circuit (e.g., PCBA, flexible circuit, or the like) implemented in a band. In yet another example, microchips 314-318 may exchange data wirelessly with a band using a short-range communication protocol (e.g., NFC, Bluetooth®, ultra wideband, or the like), for example, with a band including a powered NFC device configured to power, and access the data in, one or more of microchips 314-318 when brought into a close or threshold proximity (e.g., ten centimeters or less, or other close distance sufficient for establishing an NFC link). In other examples, the quantity, type, function, structure, and configuration of the elements shown may be varied and are not limited to the examples provided.

FIG. 4 illustrates an exemplary architecture for a data-capable band implemented with a wireless enabled cap, according to some examples. Here, data-capable band (hereinafter "band") 400 includes cap 402, one or more processors 414, communication facility 416, sensor 418, battery 420 (e.g., a rechargeable battery, Lithium-Ion battery, Nickel- Metal Hydride battery, etc.), audio plug 422 (e.g., TRS, TRRS, USB, micro USB, 3.5 mm plug, ¼ inch plug, etc.), and vibration source 424. In some examples, cap 402 may include a wireless/NFC tag 404, which may include antenna 406 and microchip 408, including memory 410 and one or more processors 412. Like-numbered and named elements may describe the same or substantially similar elements as those shown in other descriptions. In some examples, processor 414 may be implemented as part of a printed circuit board assembly (PCBA). In some examples, communication facility 416 may be configured to communicate or exchange data with one or more devices, wired or wirelessly (e.g., 126), for example, using a communications network (wired and/or wireless router, IEEE 802.11 network, Ethernet network, WiFi network, WiMAX network, Bluetooth network, Ad Hoc WiFi network, etc.). As used herein, "facility" refers to any, some, or all of the features and structures that are used to implement a given set of functions. For example, communication facility 416 may include one or more controllers (e.g., Bluetooth® controller, WiFi controller, mobile broadband controller, and the like) for communicating using short-range or longer range communication protocols, as described herein. In some examples, sensor 418 may include one or more sensors (e.g., active and/or passive), or a sensor array, for capturing sensor data relating to temperature, environment, time, motion, activity, physiology, medical condition, and the like. In some examples, said sensor array may include, without limitation, an accelerometer, an altimeter/barometer, a light/infrared ("IR") sensor, a pulse/heart rate ("HR") monitor, an audio sensor (e.g., microphone, transducer, or others), a pedometer, a velocimeter, a global positioning system (GPS) receiver, a location-based service sensor (e.g., sensor for determining location within a cellular or micro-cellular network, which may or may not use GPS or other satellite constellations for fixing a position), a motion detection sensor, an environmental sensor, a chemical sensor, an electrical sensor, or mechanical sensor, and the like, installed, integrated, or otherwise implemented on band 102.

In some examples, cap 402 may include a housing (e.g., inner housing 216 and outer housing 218 in FIG. 2, inner housings 302a, 304a and 306a, and outer housings 302b, 304b and 306b, in FIG. 3, and the like) configured to cover audio plug 422. In some examples, processor 412 may be configured to process data to be stored in memory 410, and to be exchanged with other NFC capable devices, for example using antenna 406. In some examples, antenna 406 may be implemented as a multi-purpose antenna. In some examples, memory 410 may be configured to store at least 128 bytes, and up to 2,000 bytes or more, of data. In some examples, wireless/NFC tag 404 may be configured to exchange data with communication facility 416, for example, to send data (e.g., biometric identifier, other identifier, verification information, authentication information, control data (e.g., to cause an application to open, to pair band 400 with another Bluetooth® device, to sync band 400 with another Bluetooth® device, to turn on Bluetooth® or WiFi capabilities in band 400, to sync band 400 with an application on a different device, to modify settings on band 400, or the like), or other stored data) to other components of band 400. In some examples, wireless/NFC tag 404 may be NFC Forum Type 2 tag compliant, NFC Forum Type 4 tag compliant, or the like. In other examples, band 400 may include other components or elements, such as a user interface, a flexible circuit, a notification facility, one or more buttons, and the like, which may not be depicted herein, but are depicted and/or described in the above mentioned Co-Pending U.S. patent applications and/or issued U.S. patents, which are incorporated herein by reference in their entirety for all purposes. In still other examples, the quantity, type, function, structure, and configuration of the elements shown may be varied and are not limited to the examples provided.

Figure 5:
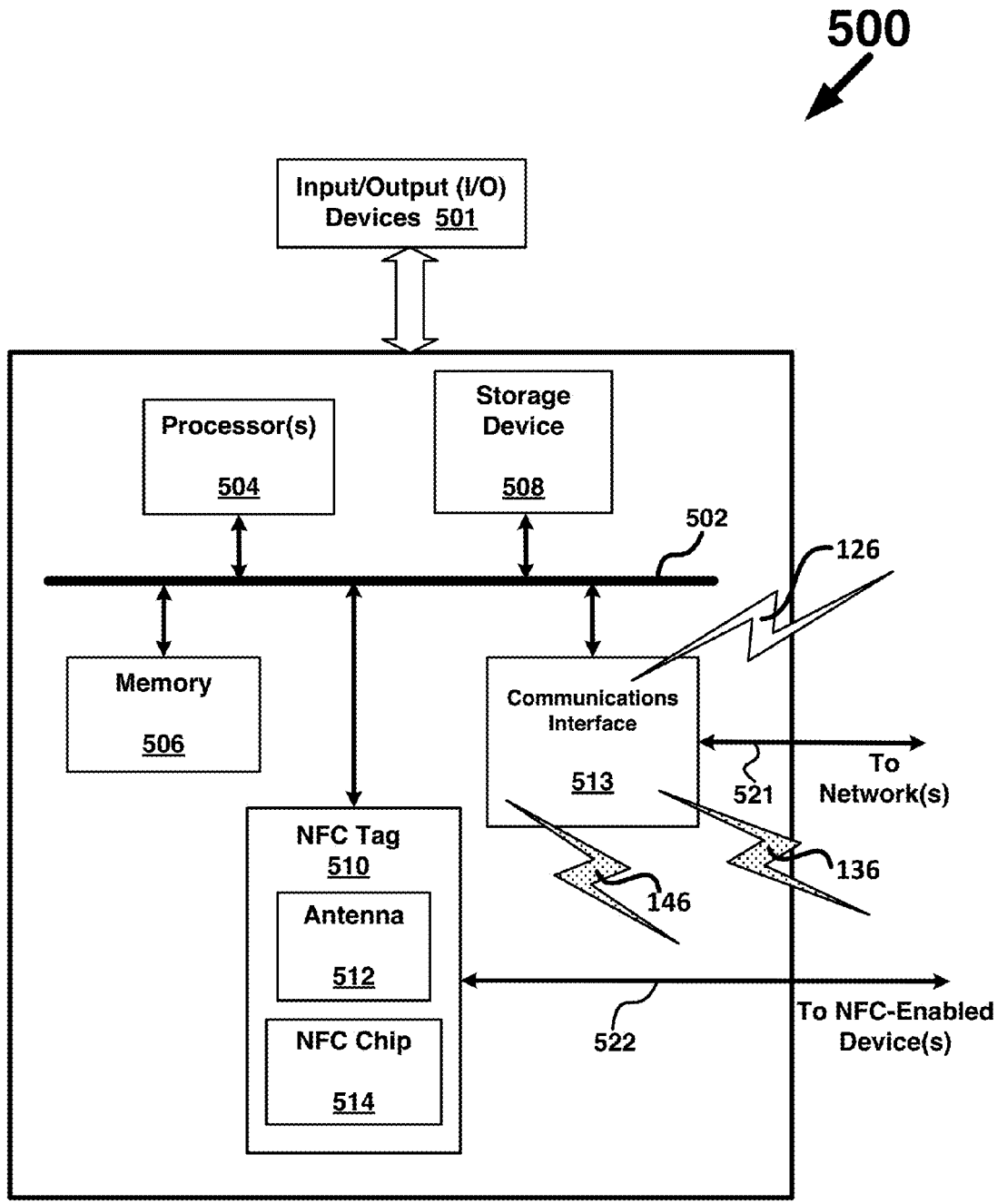
FIG. 5 illustrates an exemplary computing platform suitable for a data-capable band implemented with a wireless enabled cap, according to some examples.

FIG. 5 illustrates an exemplary computing platform suitable for a data-capable band implemented with a wireless enabled cap, according to some examples. In some examples, computing platform 500 may be used to implement computer programs, applications, methods, processes, algorithms, or other software to perform the above-described techniques. Computing platform 500 includes a bus 502 or other communication mechanism for communicating information and/or signals, which interconnects subsystems and devices, such as one or more processors 504, system memory 506 (e.g., RAM, Flash, etc.), storage device 508 (e.g., ROM, etc.), a communication interface 513 (e.g., an Ethernet and/or wireless controller, a Bluetooth controller, etc.) to facilitate communications via a port on communication link 521 to communicate, for example, with a computing device, including mobile computing and/or communication devices with processors and/or wireless communication (e.g., 126, 136, 146) with one or more wireless devices/systems, and an NFC tag 510, including antenna 512 and NFC chip 514, to facilitate direct communication with an NFC-enabled device. Processor 504 may be implemented with one or more central processing units ("CPUs"), such as those manufactured by Intel® Corporation, or one or more virtual processors, as well as any combination of CPUs and virtual processors. Computing platform 500 exchanges data representing inputs and outputs via input-and-output (I/O) devices 501, including, but not limited to, keyboards, mice, touch pad, audio inputs (e.g., speech-to-text devices), user interfaces, displays, monitors, cursors, gesture recognition, image capture device (e.g., video and/or still camera), proximity detection sensors, touch-sensitive displays, touch-screen, LCD, OLED, LED, or other types of displays, speakers, microphones, media players and other I/O-related devices.

According to some examples, computing platform 500 performs specific operations by processor 504 executing one or more sequences of one or more instructions stored in system memory 506 (e.g., a non-transitory computer readable medium such as Flash memory or the like), and computing platform 500 may be implemented in a client-server arrangement, peer-to-peer arrangement, or as any mobile computing device, including smart phones and the like. Such instructions or data may be read into system memory 506 from another non-transitory computer readable medium, such as storage device 508. In some examples, hard-wired circuitry may be used in place of or in combination with software instructions for implementation. Instructions may be embedded in software or firmware. The term "computer readable medium" refers to any non-transitory medium that participates in providing instructions to processor 504 for execution. Such a medium may take many forms, including but not limited to, non-volatile media and volatile media. Non-volatile media includes, for example, optical or magnetic disks and the like. Volatile media includes dynamic memory, such as system memory 506.

Common forms of non-transitory computer readable media may include, for example, floppy disk, flexible disk, hard disk drive (HDD), solid state disk (SSD), magnetic tape, any other magnetic medium, CD-ROM, any other optical medium, punch cards, paper tape, any other physical medium with patterns of holes, RAM, PROM, EPROM, Flash Memory, FLASH-EPROM, any other memory chip or cartridge, or any other medium from which a computer may read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 502 for transmitting a computer data signal.

In some examples, execution of the sequences of instructions may be performed by computing platform 500. According to some examples, computing platform 500 may be coupled by communication link 521 (e.g., a wired network, such as LAN, PSTN, or any wireless network) to any other processor to perform the sequence of instructions in coordination with (or asynchronous to) one another. Computing platform 500 may transmit and receive messages, data, and instructions, including program code (e.g., application code) through communication link 521 and communication interface 513. Received program code may be executed by processor 504 as it is received, and/or stored in memory 506 or other non-volatile storage for later execution.

In the example shown, system memory 506 may include various modules that include executable instructions to implement functionalities described herein. As depicted in FIGS. 1-4 herein, the structures and/or functions of any of the above-described features may be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in FIG. 4 may represent one or more algorithms. Or, at least one of the elements may represent a portion of logic including a portion of hardware configured to provide constituent structures and/or functionalities.

As hardware and/or firmware, the above-described structures and techniques may be implemented using various types of programming or integrated circuit design languages, including but not limited to hardware description languages, such as any register transfer language ("RTL") configured to design field-programmable gate arrays ("FPGAs"), application-specific integrated circuits ("ASICs"), multi-chip modules, digital circuitry, analog circuitry, mixed-analog-digital circuitry, radio frequency (RF) circuitry, or any other type of integrated circuit. At least one of the elements in FIG. 4 may be implemented in one or more computing devices that include one or more circuits, and thus may represent one or more components of hardware. Or, at least one of the elements may represent a portion of logic including a portion of circuit configured to provide constituent structures and/or functionalities.

According to some embodiments, the term "circuit" may refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit may include a system of electronic components and logic components (e.g., logic configured to execute instructions, such that a group of executable instructions of an algorithm, for example, and, thus, is a component of a circuit). According to some embodiments, the term "module" may refer, for example, to an algorithm or a portion thereof, and/or logic implemented in either hardware circuitry or software, or a combination thereof (e.g., a module may be implemented as a circuit). In some embodiments, algorithms and/or the memory in which the algorithms are stored are "components" of a circuit. Thus, the term "circuit" may also refer, for example, to a system of components, including algorithms. These may be varied and are not limited to the examples or descriptions provided.

Figure 6:
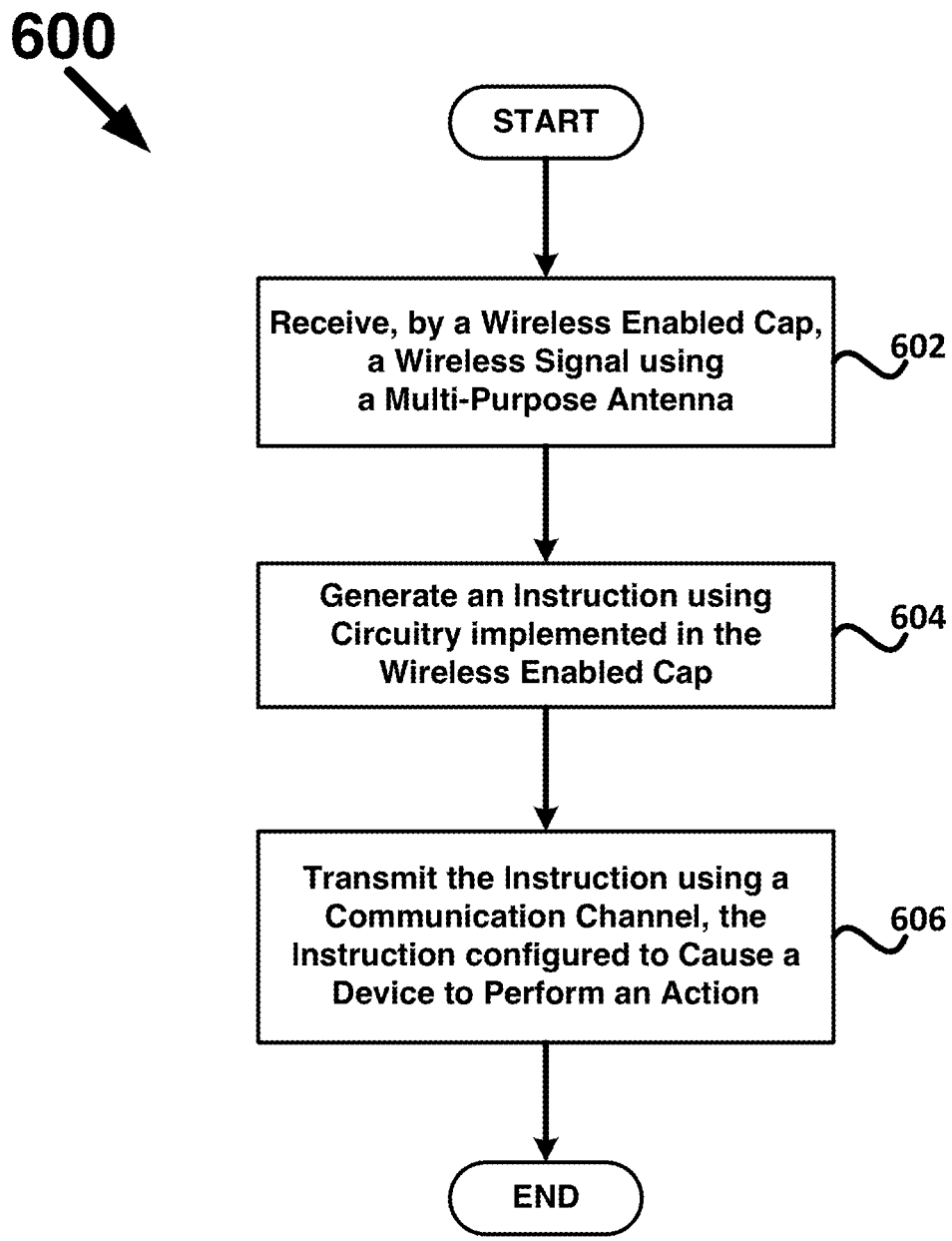
FIG. 6 illustrates an exemplary flow for transmitting an instruction to perform an action using a wireless enabled cap, according to some examples.

FIG. 6 illustrates an exemplary flow for transmitting an instruction to perform an action using a wireless enabled cap, according to some examples. Here, flow 600 begins with receiving, by a wireless enabled cap, a wireless signal using a multi-purpose antenna (602). In some examples, said wireless signal may be a RF signal. In some examples, wireless enabled cap may include one or more housings, and a wireless tag or controller, as described herein. For example, said wireless enabled cap may include an NFC tag having a microchip and an antenna. In some examples, said multi-purpose antenna may be implemented to serve multiple functions, including sending and receiving radio signals, as well as decorative or informative functions, where the antenna is formed using electrically conductive ink, as described herein. Once a wireless signal is received, an instruction may be generated using circuitry implemented in the wireless enabled cap (604). In some examples, such circuitry may be implemented as a wireless-to-wired converter. In some examples, said circuitry may be implemented as part of an NFC tag. In some examples, the instruction may be responsive to an NFC signal from another NFC-enabled device. For example, the instruction may include data associated with a biometric identifier, other identifier, verification information, authentication information, control data, or other stored data. In some examples, the instruction also may include logic configured to perform one or more functions, for example, to cause an application to open, to generate a pairing between Bluetooth® devices, to sync Bluetooth® devices, to turn on Bluetooth® or WiFi capabilities in a band, to sync a band with an application on another device, to modify settings on a band or another device, or the like. The instruction may be transmitted using a communication channel, the instruction configured to cause a device to perform an action (606). In some examples, the communication channel may be a wired communication channel, for example, using one or more contacts configured to couple to an audio plug or a circuit implemented in a band. In other examples, the communication channel may be wireless, for example, using a short-range communication protocol, as described herein. In other examples, the above-described process may be varied in steps, order, function, processes, or other aspects, and is not limited to those shown and described.

Here, in flow 600, at the stage 602, the receiving the wireless signal by the wireless cap using the multipurpose antenna (e.g., 110) may include the wireless signal coupling with the antenna to generate a signal that is electrically coupled with the microchip 108 to cause the microchip 108 (e.g., the passively powered microchip) to be powered by the signal while the signal is persistent, as was described above. The electrical power generated by the wireless signal coupling with the antenna may operate to power the microchip 108 to generate the instruction using circuitry at the stage 604 and/or transmit the instruction at the stage 606.

Figure 7A:
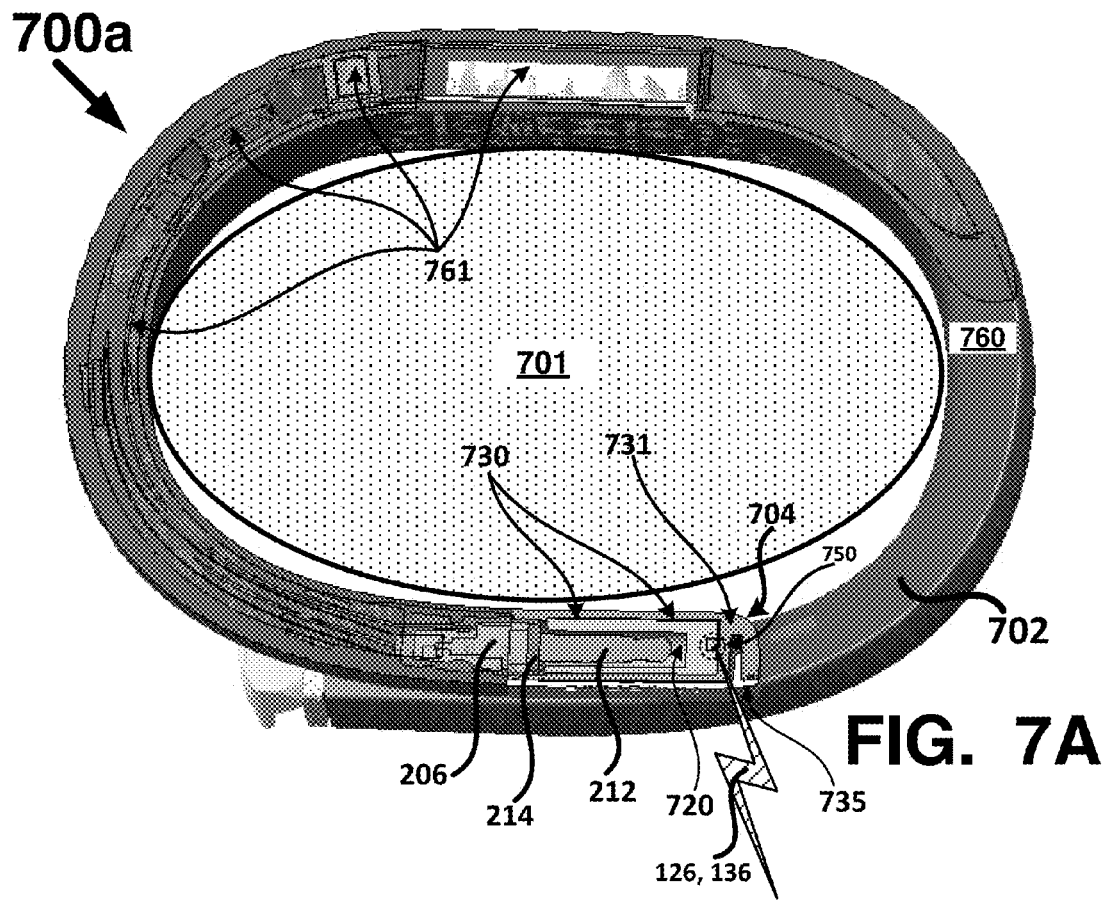
FIG. 7A depicts a partial cross-sectional view of a data-capable device in a form of a band, and a wireless enabled cap connected with the band, according to some examples.
Figure 7B:
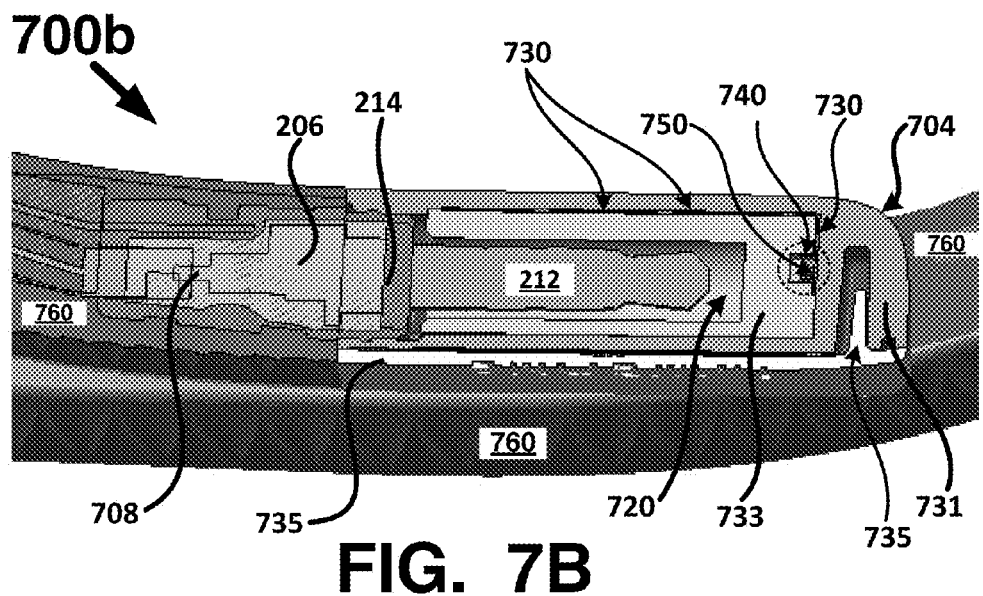
FIG. 7B depicts a more detailed partial cross-sectional view of the wireless enabled cap of FIG. 7A, according to some examples.

Attention is now directed to FIGS. 7A and 7B were partial cross-sectional views 700a and 700b, respectively, of a data-capable device 702 (e.g., a wearable structure such as a data-capable band, wearable device, a smart watch, etc.) and a wireless enabled cap 704 connected with the device 702 (band 702 hereinafter) are depicted. In some examples, wireless enabled cap 704 may include additional structure and/or components than those described above for wireless enabled cap 104. In other examples, wireless enabled cap 704 may exclude structure and/or components described above for wireless enabled cap 104. A chassis 760 of the data-capable band 702 may be configured to connect at least a portion of the band 702 with a body portion 701 (depicted in cross-section) of a user (not shown). Body portion 701 may include but is not limited to an arm, a leg, a wrist, a neck, an ankle, abdomen, torso, a calf, a thigh, triceps, or bicep, for example. Data-capable band 702 may be donned on body portion 701 using a variety of methods including but not limited to wrapping or flexing band 702 around a partial and/or full circumference of the body portion 701, strapping band 702 to the body portion 701, just to name a few. Interior portions of chassis 760 may include structures denoted generally as 761 that may include but are not limited to electronic systems (e.g., in FIGS. 4 and 5), circuitry, sensors, power sources, and structure that allows band 702 to retain its shape when donned by a user. Band 702 is a non-limiting example of a device 702 that may be coupled with a wirelessly enabled cap, such as caps 104, 704, and other caps described herein, and the present application is not limited to the examples of devices depicted herein.

Cap 704 is depicted mounted to the band 702. Mounting may be accomplished by inserting plug 212 into a cavity 720 of cap 704. Cap 704 may include one or more structures (e.g., 811) configured to retain the cap 704 on the plug as will be described below in reference to FIGS. 8A-8B. For example, the structures may be configured to grip plug base 214 with a force (e.g., a friction force) that retains the cap on the band 702, but also allows for the cap 704 to be removed when necessary. Plug 212 may be electrically coupled with one or more systems and/or circuitry in band 702 using a connector portion 708. Cap 704 may comprise a variety of materials including but not limited to electrically conductive materials, electrically non-conductive materials, plastics, metals, metal alloys, composites, etc. As one example, cap 704 may include a first material 733 having cavity 720 formed therein to receive plug 212 and having another cavity 740 (depicted inside dashed line) formed therein to receive tag 106 and/or microchip 108 denoted as chip 750, a second material 731 that may surround at least a portion of the first material 733, and an antenna 730 which may be positioned between the first 733 and second 731 materials. Antenna 730 (e.g., antenna 110) may be routed around one or more surfaces of the first material 733 and may be coupled with electrical nodes on chip 750 using soldering, crimping, surface mounting, etc. Antenna 730 may be formed from a variety of materials including but not limited to a flexible printed circuit board, a flexible electrically conductive substrate, an electrically conductive substrate, for example. The first material 733, the second material 731 or both may be made from electrically non-conductive materials, such as plastics, rubber, composites, synthetics, organic and/or inorganic materials, or other materials. Material selection for 731 and/or 733 may be based on materials that will not impair (e.g., substantially attenuate or block) RF signals from being transmitted and/or received by antenna 730. Cap 704 may optionally include a structure 735 that may be coupled with the second material 731 (e.g., by glue, adhesives, fastener, etc.). Structure 735 may have a functional purpose (e.g., as an antenna), an esthetic purpose (e.g., a brand logo, to add color(s), a fashionable design, etc.) or both. Orientation of cap 704 relative to band 702 when mounted on the band 702 may be application dependent and is not limited to the examples depicted in FIGS. 7A-7B. Furthermore, arrangement of the other components of cap 704 (e.g., 730, 750, 740, 720, 735, etc.) may be application dependent and is not limited to the examples depicted in FIGS. 7A-7B.

Chip 750 may comprise a wireless component such as a NFC chip, NFC tag, or the like. For example, chip 750 may comprise a NTAG203 NFC chip or other device for use in a NFC enabled device, such as cap (104, 704, 904). Chip 750 may conform to a protocol or standard such as that of the NFC Forum or other NFC standards for wireless devices. Chip 750 may be an ASIC that is custom designed for an application specific NFC device. Dimensions for chip 750 will be application specific; however, a typical die (e.g., from a semiconductor wafer) for chip 750 may be about 5 mm or less on a side (e.g., 2 mm by 2 mm or less). Accordingly, a cavity (e.g., 740, 940) in which the chip 750 is mounted in cap (104, 704, 904) may be dimensioned accordingly to accommodate mounting of the chip 750 in the cavity or other structure in the cap (104, 704, 904) that receives the chip 750. Chip 750 may comprise one of the above described chips (e.g., 108, 208, 318, 408, or 514) for a wireless NFC tag (e.g., 510, 404, or 106). The cap 704 when mounted or otherwise connected with a device, such as band 702 (see FIG. 7A) for example, may wirelessly communicate (e.g., 126, 136) with other wireless devices, wireless client devices, smartphone, tablets, pads, wireless networks (e.g., WiFi, WiMAX, one or more varieties of IEEE 802.x, Bluetooth, Bluetooth Low Energy, NFC, or others, etc.).

FIGS. 8A and 8B depict profile 800a and cross-sectional 800b views, respectively of another example of wireless enabled cap 704. In FIG. 8A, an entrance end of cap 704 may include one or more structures 811 configured to engage plug 212 (e.g., grip plug base 214) when plug 212 is inserted into cavity 720. A back surface 720b of cavity 720 may be operative to prevent mechanical and/or electrical contact between plug (212, 912) and chip 750 and/or antenna 730. Antenna 730 (depicted in dashed outline) may be positioned below second material 731 and between first material 733 or embedded in first material 731 as is depicted in greater detail in FIGS. 8B and 8C. Antenna 730 may be routed over and/or between one or more surfaces of materials 733 and/or 731. For example, antenna 730 may be routed over a first portion of first material 733 and over a second portion of first material 733, with the second portion positioning the antenna 730 for electrical connection with chip 750 in cavity 740. Here, antenna 730 may be bent or folded over an edge 821 of the first material 730 to position a portion of antenna 730 on the second portion of the first material 733. Second material 731 may include a cavity 841 configured to receive a portion of structure 735. Structure 735 may include indicia 835 that may be functional, esthetic or both. For example, indicia 835 may be a logo, a trademark, artwork, instructions, an image, a name, initials, a nick name, a monogram, a model number, a serial number, etc., just to name a few. Materials for 731 may include but are not limited to an electrically conductive substrate, an electrically conductive flexible substrate, metal, metal alloys, a plastic substrate having electrically conductive structures, FPCB, and polyimide, for example.

In FIG. 8C, two examples of configurations (800c and 800d) of antenna 730 embedded in the first material 731 of cap 704 are depicted. Configuration 800d depicts several different example configurations for the antenna embedded in cap 704 as will be described below. In configuration 800c, antenna 730 may be embedded in first material 731 and may span along top and side portions of the first material 731. In configuration 800d, antenna 730 may be embedded in first material 731 and may span along a top portion of the first material 731 (e.g., see antenna 730 which may be embedded in top portion of material 1131 in configuration 1100a of FIG. 11). Alternatively, in configuration 800d, antenna 730 may be embedded in first material 731 and may span along another portion of the first material 731, such as a side portion as depicted by a vertical position of an antenna 730a along the side portion (e.g., see antenna 730a which may be embedded in side portion of material 1131 in configuration 1100a of FIG. 11), in contrast to the horizontal position of the antenna 730 along the top portion in configuration 800d.

In some examples, antenna 730 may be embedded in the structure 735 as depicted by antenna 730b. In yet other examples, antenna 730 may be embedded in the first material (e.g., 730 and/or 730a) and may also be embedded in the structure 735 as depicted by antenna 730b in configuration 800d (e.g., see antennas 730, 730a, 730b which may be embedded in materials 1131 and/or 1135 in configuration 1100a of FIG. 11). Antennas (730, 730a, 730b, 730c) may be electrically coupled with chip 750 using any suitable means including soldering, crimping, direct contact of their respective nodes, etc. Materials for 731 and/or 735 may be selected for properties consistent with reliable RF signal transmission and/or reception for antennas (730, 730a, 730b, 730c).

Moving on to FIGS. 9A-9C where front profile 900a, back profile 900b, and cross-sectional 900c views of a wireless enabled cap 904 including an antenna 930 positioned on an exterior portion of the wireless enabled cap 904 are depicted. In some examples, wireless enabled cap 904 may include additional structure and/or components than those described above for wireless enabled cap 104 and/or 704. In other examples, wireless enabled cap 904 may exclude structure and/or components described above for wireless enabled cap 104 and/or 704. A first material 933 may serve as a foundation (e.g., a mandrel or preform) upon which the antenna 930 may be disposed. For example, first material 933 may include arcuate surfaces 941 and antenna 930 may be conformally coupled with one or more surfaces of the first material 933 such that antenna 930 conformally covers the one or more surfaces. The first material 933 may include the cavity 730 through which plug 212 may be inserted 921 to mount the cap 904 to the band (102, 202, 702). Antenna 930 may be made from a flexible material, such as a flexible printed circuit board material, a flexible electrically conductive material, or other suitable materials. Antenna 930 may be made from an inflexible material that is shaped (e.g., by pressing, stamping, machining, rolling, or other machine processes) to conform to a shape of first material 933. In the back side view of FIG. 9B, a portion of antenna 930 may be positioned on a back surface 933b of material 933 to allow that portion of antenna 930 to be electrically coupled with chip 740 in a cavity 940, as depicted in FIG. 9C. The back surface 933b may include a groove, indentation, recess, depression, or the like, denoted as 933g, in which the portion of antenna 930 may be disposed in when positioned on the back surface 933b.

Antenna 930 may include a structure 951 operative to receive the chip 750. Structure 951 may be formed from the same material as antenna 930 or may be made from a different material (e.g., an electrically insulating material) that is connected with antenna 930. Structure 951 may be operative to align chip 750 and antenna 930 with each other to facilitate electrical connection (e.g., via soldering, etc.) of electrically conductive nodes on chip 750 with electrically conductive nodes on antenna 930. For example, the nodes may comprise pads, bumps, balls, or other electrically conductive structures. Structure 951 may be configured to fit inside cavity 940 when antenna 930 is positioned on first material 933. In FIG. 9C, the cavity 720 through which plug 212 may be inserted 921 to mount the cap 904 to the band (102, 202, 702) may be configured to receive a plug, connector, or the like having a different configuration than plug 212, such as a male or female USB connector or plug for example. As one example, a male micro USB plug 912 may be inserted 921 into cavity 720 to mount the cap 904 to the band (102, 202, 702). First material 933 may be formed to include the cavity 720 having a shape configured to receive a profile of the plug 912. Suitable electrical connections with circuitry and systems in band (102, 202, 702) may be made by electrically coupling node 912c of plug 912 with the circuitry and/or systems using wire, PCB traces, busses, or other types of electrically conductive structures. Other types of plugs and/or connectors may be used and the foregoing are non-limiting examples.

Attention is now directed to FIG. 10A where a profile view of an antenna structure 930 for a wireless enabled cap 904 is depicted. Here, antenna 930 may be formed from a flexible electrically conductive substrate such as a flexible printed circuit board (FPCB), where all or a portion of the substrate may be electrically conductive. The substrate for antenna 930 may be cut, punched, sawed, cast or otherwise formed to the desired shape. As described above in reference to FIGS. 9B and 9C, a portion of antenna 930 (denoted as 1030 in FIG. 10A) may be positioned on a back surface 933b of material 933 and may include the cavity 940 and structures 951 for mounting or otherwise positioning the chip 750 relative to antenna 930 to facilitate electrical coupling between nodes on the chip and nodes on the antenna 930 (see FIG. 10B). Antenna 930 may include portions 1041 that are arcuate and/or include bends, folds, or non-planar shapes or contours, for example.

FIG. 10B depicts a cross-sectional profile view of the antenna structure 930 for a wireless enabled cap 904 and illustrates in greater detail the portion 1030 and its associated structure 951 and cavity 940 in which chip 750 is disposed. Structures 951 may be made from the same or different materials than antenna 930 and may be formed in a material of the antenna 930 or may be separately formed and mounted to the antenna 930 using adhesives, fasteners, glue, welds, etc., just to name a few.

FIG. 10C depicts a plurality of different views of an antenna structure 930 for a wireless enabled cap 904. The various shapes for antenna 930 may be formed by pressing, stamping, machining, rolling, vacuum forming, heating, or other machine processes. FIG. 10D depicts a plan view of an electrically conductive substrate that may be used as a starting material for an antenna structure 930 for a wireless enabled cap 904. Here, the starting material may comprise a substrate or sheet of an electrically conductive material (e.g., stainless steel or other metal and metal alloys) that is formed to a desired shape such as that depicted in the plan view of FIG. 10D, and then the above mentioned processes may be used to fashion the antenna 930 into its desired final shape. As describe above, first material 933 may serve as a mandrel or preform over which the antenna may be formed. In some examples, the starting material may not include the structures 951, and those structures may be later added as described above. In other examples, the starting material may not necessarily be an electrically conductive material or only portions of the starting material may be electrically conductive, such as the traces on a PCB or flexible PC board. The starting material may be an electrically non-conductive material or substrate (e.g., plastic, glass, dielectric material) upon which an electrically conductive material is applied or otherwise deposited or formed (e.g., via printing silk screening, screen printing, etc.) to create an electrically conductive medium for antenna 930, such as electrically conductive inks, paints, dyes, particles, graphene, nano-particles, for example.

Figure 11:
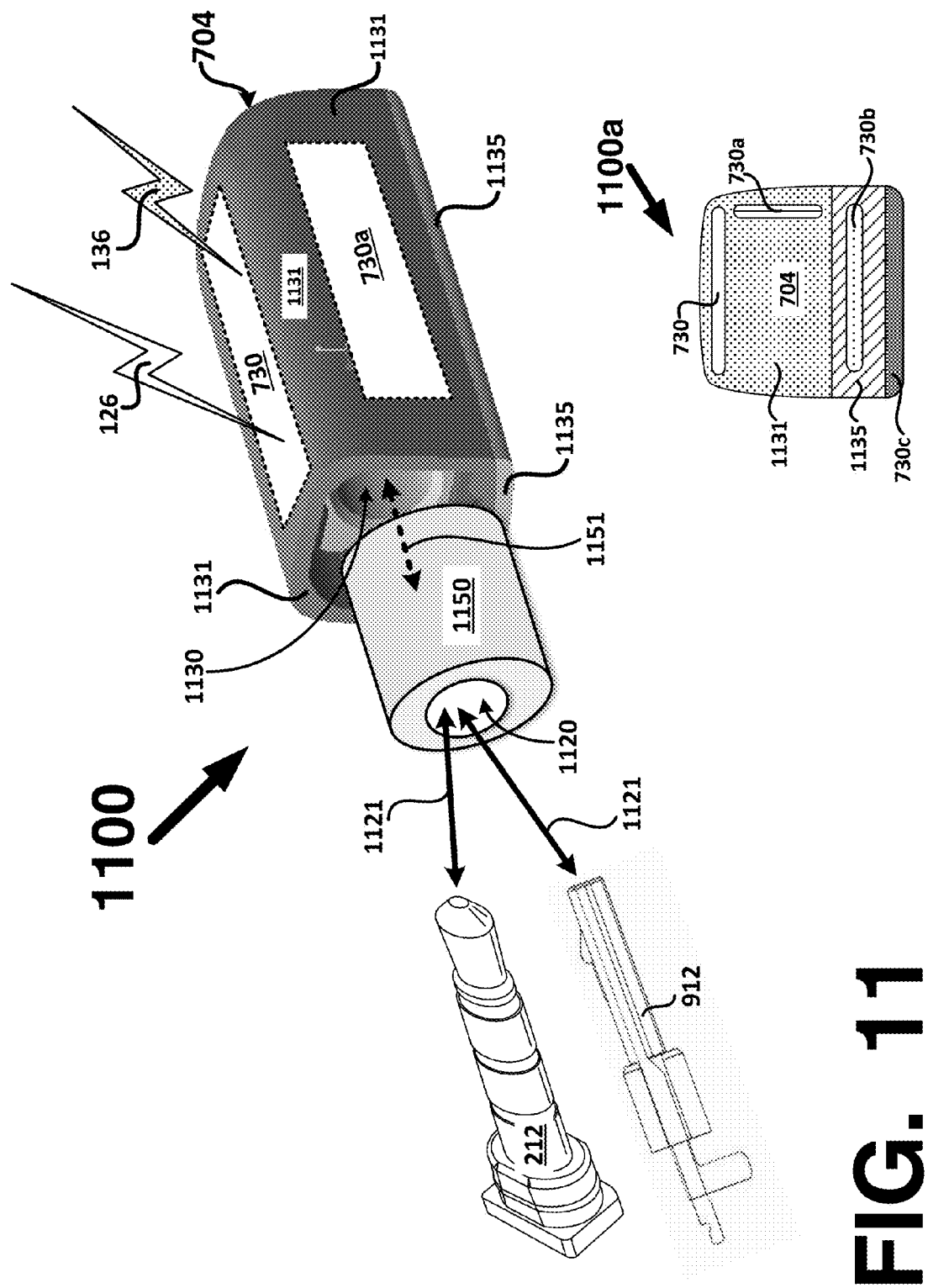
FIG. 11 depicts a profile view of an example of a wireless enabled cap including a RF isolation structure and an example of a cross-sectional view of a wireless enabled cap including one or more embedded antennas, according to some examples.

Referring now to FIG. 11 where a profile view of a wireless enabled cap 704 including a RF isolation structure 1150 is depicted. Here, in example 1100, a RF isolation structure 1150 may be positioned in a cavity 1130 formed in a material 1131 of cap 704. The RF isolation structure 1150 may include a cavity 1120 formed therein and operative to receive at least a portion of the plug 212 or 912 by insertion 1121 of the plug into the cavity 1120, for example. For example, if plug 212 comprises a TRS, TRRS, a 2.5 mm audio plug or a 3.5 mm audio plug, then the cavity 1120, and optionally cavity 1130, may be sized accordingly to allow insertion of the plug 212. Similarly, cavity 1120, and optionally cavity 1130, may be sized accordingly to allow insertion of other types of plugs, such as the plug 912 (e.g., USB, micro USB, mini USB, Lightning® plug, RJ-45 plug, etc.), for example.

RF isolation structure 1150 may comprise a ferrite coil, a ferrite core, tape wound core, or other type of RF isolation devices (e.g., made from high magnetic permeability and low electrical conductivity materials) operative to isolate antenna 730 and/or improve RF performance of the antenna 930 and/or chip 750. In some examples, metallic structures (e.g., plugs 212, 912) or other structures in close proximity of antenna 730 may interfere with RF signal reception by antenna 730. For example, in FIG. 11, antenna 730, depicted in dashed line, may be positioned below (e.g., see 730 in FIGS. 8A and 8B) or embedded in a first material 1131 and/or embedded in a material 1135 (e.g., see embedded antennas 730, 730a, 730b in configurations 800c and 880d of FIG. 8C). An antenna 730c may be positioned on the material 1135 as depicted in example 1100a of FIG. 11. Antenna 730c may comprise an electrically conductive material connected with material 1135 or applied/deposited/formed on material 1135 (e.g., using a conductive ink or the like). RF isolation structure 1150 may isolate one or more antennas (e.g., 730, 730a, 730b) from other structures such as a second material 1135 that may be functional or non-functional, and/or the plug (212, 912), for example. Second material 1135 may be made from a different material than first material 1131. Second material 1135 may be electrically conductive or electrically non-conductive. As one example, the second material may comprise a plastic or other electrically non-conductive material and may be used for an esthetic purpose or include indicia, a logo, a trademark, artwork, instructions, an image, a name, initials, a nick name, a monogram, a model number, a serial number, etc., just to name a few. In other examples, second material may be selected to provide RF isolation of antenna 730. The cap 704 may have a different shape and/or configuration than depicted in the non-limiting example of FIG. 11. In other examples, structure 1135 may be made from a material suitable for embedding the antenna (e.g., antenna 730b) in the structure 1135 as depicted in example configuration 1100a. In FIGS. 8A-11, the cap 704 when mounted or otherwise connected with a device, such as band 702 (see FIG. 7A) for example, may wirelessly communicate (e.g., 126, 136) with other wireless devices, wireless client devices, smartphone, tablets, pads, wireless networks (e.g., WiFi, WiMAX, one or more varieties of IEEE 802.x, Bluetooth, Bluetooth Low Energy, NFC, or others, etc.).

Figure 12:
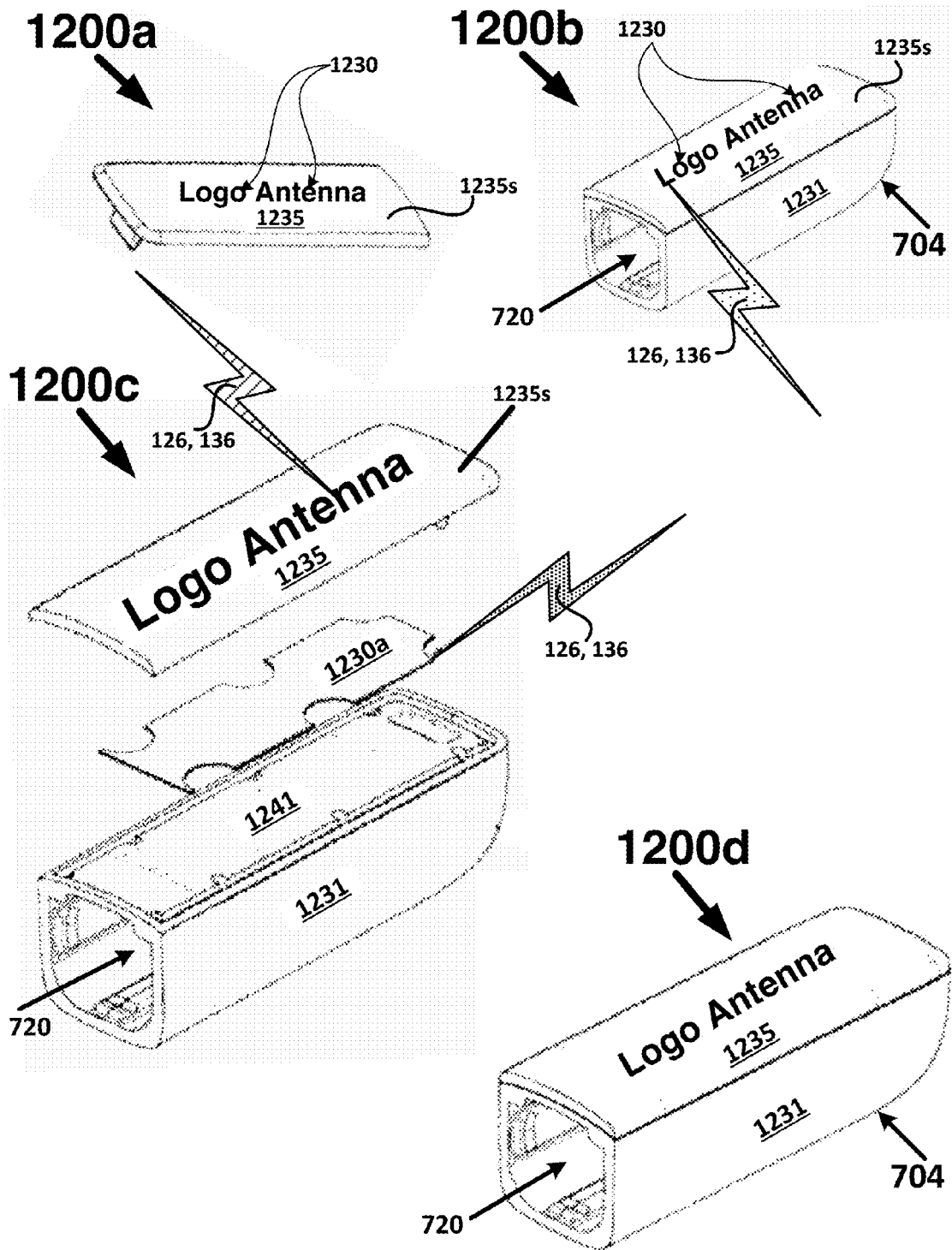
FIG. 12 depicts examples of a wireless enabled cap including one or more antennas where at least one of the antennas may include an electrically conductive ink or the like, according to some examples.

Attention is now directed to FIG. 12 where examples 1200a-1200d depict an antenna 1230 that may be printed, deposited, screen printed, silk screened, or otherwise formed on an electrically non-conductive structure or surface, such as material 1235, for example, using an electrically conductive ink, paste, dye, plastic, or other suitable materials. In example 1200a, a surface 1235s of material 1235 may have a logo or other design formed on it using any number of processes, such as those described above. The logo antenna 1230 may be electrically coupled with chip 750 (not shown) using any suitable electrically conductive structure such as wire, conductive traces, etc. In example 1200b, material 1235 may be coupled (e.g., using glue, press fitting, adhesive, fastener, welding, etc.) with material 1231 to form cap 704, which may be operative to wirelessly communicate (126, 136) as described above.

In example 1200c, cap 704 may include the logo antenna 1230, another antenna 1230a, or both. Antenna 1230a may be a flexible PC board, or some other electrically conductive substrate that is electrically coupled with chip 750 (not shown) and positioned on a structure 1241, for example. Either one or both of the antennas 1230, 1230a, may be used for the aforementioned wireless communications (126, 136). In example 1200d, the components of example 1200c may be coupled to form cap 704. Other embedded and/or non-embedded antennas (not shown) may be included in the cap 704 depicted in examples 1200a-1200d, such as those depicted in FIGS. 8A-9C and 11, for example. Antenna 1230 need not be a logo and may comprise any form or design that may be printed or otherwise formed on material 1235. Antenna 1230 may comprise a plurality of separate antennas or discrete antennas that are formed on 1235, with each antenna electrically coupled with chip 750. In other examples, a sub-set of the plurality of separate antennas or discrete antennas that comprise 730 are electrically coupled with chip 750. The housing of the cap as described herein may be a body or other structure operative to be gripped by the fingers or digits of a user's hand to facilitate mounting and un-mounting of the cap from the plug (e.g., 212, 912) of the device (e.g., 702). The housing of the cap as described herein may include structures operative to facilitate gripping of the cap by the user, such as silicone, ridges, grooves, knurling, or other materials or structures that may provide grip, traction, etc.

The foregoing description, for purposes of explanation, uses specific nomenclature to provide a thorough understanding of the present application. However, it will be apparent to one skilled in the art that specific details are not required in order to practice the present application. In fact, this description should not be read to limit any feature or aspect of the present application to any embodiment; rather features and aspects of one embodiment may readily be interchanged with other embodiments. Notably, not every benefit described herein need be realized by each embodiment of the present application; rather any specific embodiment may provide one or more of the advantages discussed above. In the claims, elements and/or operations do not imply any particular order of operation, unless explicitly stated in the claims. It is intended that the following claims and their equivalents define the scope of the present application. Although the foregoing examples have been described in some detail for purposes of clarity of understanding, the above-described inventive techniques are not limited to the details provided. There are many alternative ways of implementing the above-described present application techniques. The disclosed examples are illustrative and not restrictive.

What is claimed is:

1. A device, comprising:
   a housing including a plurality of sensors, circuitry for capturing and storing sensor data from the plurality of sensors, and a plug operative to electrically couple with an external device, the circuitry operative to electrically communicate data, the sensor data or both with the external device using the plug;

a wirelessly enabled cap operative to be removably coupled with the housing and including a cavity operative to house the plug when the cap and housing are coupled with each other, the cap including a microchip operative to wirelessly communicate the data, the sensor data or both in accordance with at least one short-range wireless communication standard and/or protocol, and an antenna electrically coupled with the microchip.

2. The device of claim 1, wherein the antenna comprises an electrically conductive ink formed on an electrically non-conductive material of the cap.

3. The device of claim 1, wherein the antenna is disposed in an interior of the cap and is positioned between a first electrically non-conductive material in which the cavity is formed and a second electrically non-conductive material that forms a body of the cap.

4. The device of claim 1, wherein the plurality of sensors include biometric sensors and accelerometry sensors.

5. The device of claim 1, wherein the antenna is embedded in an electrically non-conductive material of the cap.

6. The device of claim 1, wherein the antenna comprises an electrically conductive material that forms an exterior surface of the cap.

7. The device of claim 1, wherein the plug comprises a connector selected from the group consisting of a 3.5 mm TRRS-type connector, a TRRS-type connector, a TS-type connector, a 2.5 mm connector, a 3.5 mm connector, a TRS-type connector, an analog audio connector, and a Universal Serial Bus (USB) connector.

8. The device of claim 1, wherein the plug when inserted into the cavity, is operative to electrically couple the microchip with the circuitry in the housing.

9. The device of claim 1, wherein the microchip is disposed in another cavity formed in the cap.

10. The device of claim 1, wherein the least one short-range wireless communication standard and/or protocol comprises a near field communication (NFC) standard and/or protocol, a Bluetooth Low Energy standard and/or protocol or both.

11. The device of claim 1, wherein the microchip and the antenna are electrically coupled with each other by soldering.

12. The device of claim 1, wherein the circuitry is operative to exchange the data, the sensor data or both with the microchip.

13. The device of claim 1, wherein the microchip is operative to wirelessly communicate the data, the sensor data or both to another wireless device, and the data, the sensor data or both are operative to cause the another wireless device to open an application.

14. The device of claim 1, wherein the microchip is operative to wirelessly communicate the data, the sensor data or both to another wireless device, and the data, the sensor data or both are operative to cause the another wireless device to sync with the circuitry in the housing.

15. The device of claim 1, wherein the microchip is further operative to wirelessly communicate the data, the sensor data or both to another wireless device, and the data, the sensor data or both are operative to cause the another wireless device to enable wireless data exchange between the circuitry and the another wireless device.

16. The device of claim 1, wherein the microchip is passively electrically powered by a radio frequency (RF) signal external to the cap.

17. The device of claim 16, wherein the antenna is operative to electrically couple the RF signal with the microchip to electrically power the microchip.

18. The device of claim 17, wherein the antenna is operative to transmit, to receive or both, a radio frequency (RF) signal associated with one or more of an external wireless device, the data, or the sensor data.

19. The device of claim 1 wherein the cap includes a plurality of antennas that are electrically coupled with the microchip.

20. The device of claim 1, wherein the housing comprises a wearable device operative to be worn on a body of a user.

* * * * *